(12) United States Patent
Lee

(10) Patent No.: US 10,963,878 B2
(45) Date of Patent: Mar. 30, 2021

(54) SYSTEM AND METHOD FOR FINANCIAL MANAGEMENT

(71) Applicant: Patricia Lee, New York, NY (US)

(72) Inventor: Patricia Lee, New York, NY (US)

(*) Notice: Subject to any disclaimer, the term of this patent is extended or adjusted under 35 U.S.C. 154(b) by 331 days.

(21) Appl. No.: 15/111,478

(22) PCT Filed: Jan. 12, 2015

(86) PCT No.: PCT/US2015/011035
§ 371 (c)(1),
(2) Date: Jul. 13, 2016

(87) PCT Pub. No.: WO2015/106206
PCT Pub. Date: Jul. 16, 2015

(65) Prior Publication Data
US 2016/0342992 A1    Nov. 24, 2016

Related U.S. Application Data

(60) Provisional application No. 61/926,631, filed on Jan. 13, 2014.

(51) Int. Cl.
*G06Q 20/40*    (2012.01)
*G06Q 20/22*    (2012.01)
(Continued)

(52) U.S. Cl.
CPC ....... *G06Q 20/4014* (2013.01); *G06Q 20/108* (2013.01); *G06Q 20/2295* (2020.05);
(Continued)

(58) Field of Classification Search
None
See application file for complete search history.

(56) References Cited

U.S. PATENT DOCUMENTS 7,771,291 B1 *  8/2010  Willett ............... A63B 53/0466
                                                    473/337
8,065,190 B2 * 11/2011  Collas .................... G06Q 20/12
                                                    705/26.1
(Continued)

FOREIGN PATENT DOCUMENTS

JP    2002-63488 A       2/2002
JP    2002063488 A   *   2/2002
(Continued)

OTHER PUBLICATIONS

Extended European Search Report dated Jun. 30, 2017in corresponding EP Application No. 15735393.9.
(Continued)

*Primary Examiner* — Nicholas D Rosen
(74) *Attorney, Agent, or Firm* — Morgan, Lewis & Bockius LLP

(57) ABSTRACT

The present teaching relates to methods, systems, and programming for financial management. In an example, a method for performing financial management is presented. A first set of rules associated with a first access credential to an account and a second set of rules associated with a second access credential to the account are provided. The second set of rules is at least partially different from the first set of rules. A determination is made whether the access credential received from a first user matches the first access credential. A first request related to the first user with respect to a transaction is received, and information regarding the transaction is extracted. At least one action is determined with respect to the first request based on the information and the first set of rules.

24 Claims, 29 Drawing Sheets

(51) Int. Cl.
*G06Q 20/32* (2012.01)
*G06Q 40/02* (2012.01)
*G06Q 30/06* (2012.01)
*G06Q 20/36* (2012.01)
*G06Q 20/10* (2012.01)
*G06Q 20/34* (2012.01)

(52) U.S. Cl.
CPC ....... *G06Q 20/3221* (2013.01); *G06Q 20/351* (2013.01); *G06Q 20/367* (2013.01); *G06Q 20/405* (2013.01); *G06Q 30/06* (2013.01); *G06Q 30/0633* (2013.01); *G06Q 40/02* (2013.01)

(56) References Cited

U.S. PATENT DOCUMENTS

| | | | | |
|---|---|---|---|---|
| 8,069,093 | B2* | 11/2011 | Archer | G06Q 30/02 705/26.82 |
| 8,127,982 | B1* | 3/2012 | Casey | G06Q 20/35785 235/379 |
| 9,547,862 | B2* | 1/2017 | Akin | G06Q 20/4037 |
| 2001/0047310 | A1* | 11/2001 | Russell | G06Q 20/04 705/26.41 |
| 2003/0061111 | A1 | 3/2003 | Dutta et al. | |
| 2007/0017976 | A1 | 1/2007 | Peyret et al. | |
| 2007/0214076 | A1* | 9/2007 | Robida | G06Q 20/10 705/38 |
| 2010/0114733 | A1* | 5/2010 | Collas | G06Q 20/12 705/26.1 |
| 2010/0131392 | A1* | 5/2010 | Archer | G06Q 30/02 705/26.1 |
| 2010/0243730 | A1* | 9/2010 | Safahi | G06Q 10/00 235/380 |
| 2011/0006113 | A1 | 1/2011 | Uchikura | |
| 2011/0030046 | A1 | 2/2011 | Shemenski et al. | |
| 2012/0197793 | A1 | 8/2012 | Grigg et al. | |
| 2012/0330784 | A1 | 12/2012 | Nahidipour | |
| 2013/0046690 | A1* | 2/2013 | Calman | G06Q 40/02 705/44 |
| 2013/0144706 | A1* | 6/2013 | Qawami | G06Q 10/02 705/14.27 |
| 2014/0006280 | A1* | 1/2014 | Scipioni | G06Q 20/322 705/44 |
| 2014/0040129 | A1* | 2/2014 | Akin | G06Q 20/4037 705/44 |
| 2014/0379576 | A1* | 12/2014 | Marx | G06Q 20/35785 705/44 |

FOREIGN PATENT DOCUMENTS

| | | | | |
|---|---|---|---|---|
| JP | 2002-99852 | A | | 4/2002 |
| JP | 2002099852 | A | * | 4/2002 |
| JP | 2002-298055 | A | | 10/2002 |
| JP | 2002298055 | A | * | 10/2002 |
| JP | 2008-512796 | A | | 4/2008 |
| JP | 2008512796 | A | | 4/2008 |
| JP | 2012-138103 | A | | 7/2012 |
| JP | 2012138103 | A | * | 7/2012 ........... G06Q 20/105 |
| JP | 2012-533113 | A | | 12/2012 |
| JP | 2012533133 | A | | 12/2012 |

OTHER PUBLICATIONS

International Search Report and Written Opinion dated May 6, 2015 in corresponding International Patent Application No. PCT/US2015/011035 (8 pages).
Office Action dated Jan. 8, 2019 in related Japanese Patent Application No. 2016-547025, 11 pages.
Supplementary Examination Report (Notice of Allowance) dated Jul. 15, 2019 in related Singaporean Patent Application No. 11201605718P, 3 pages.
Office Action issued in corresponding Chinese patent application No. 201580013377.3 dated Apr. 16, 2020 with English translation (26 pages).
Office Action issued in corresponding Japanese Patent Application No. 2016-547025 dated Dec. 10, 2019 (3 pages).

* cited by examiner

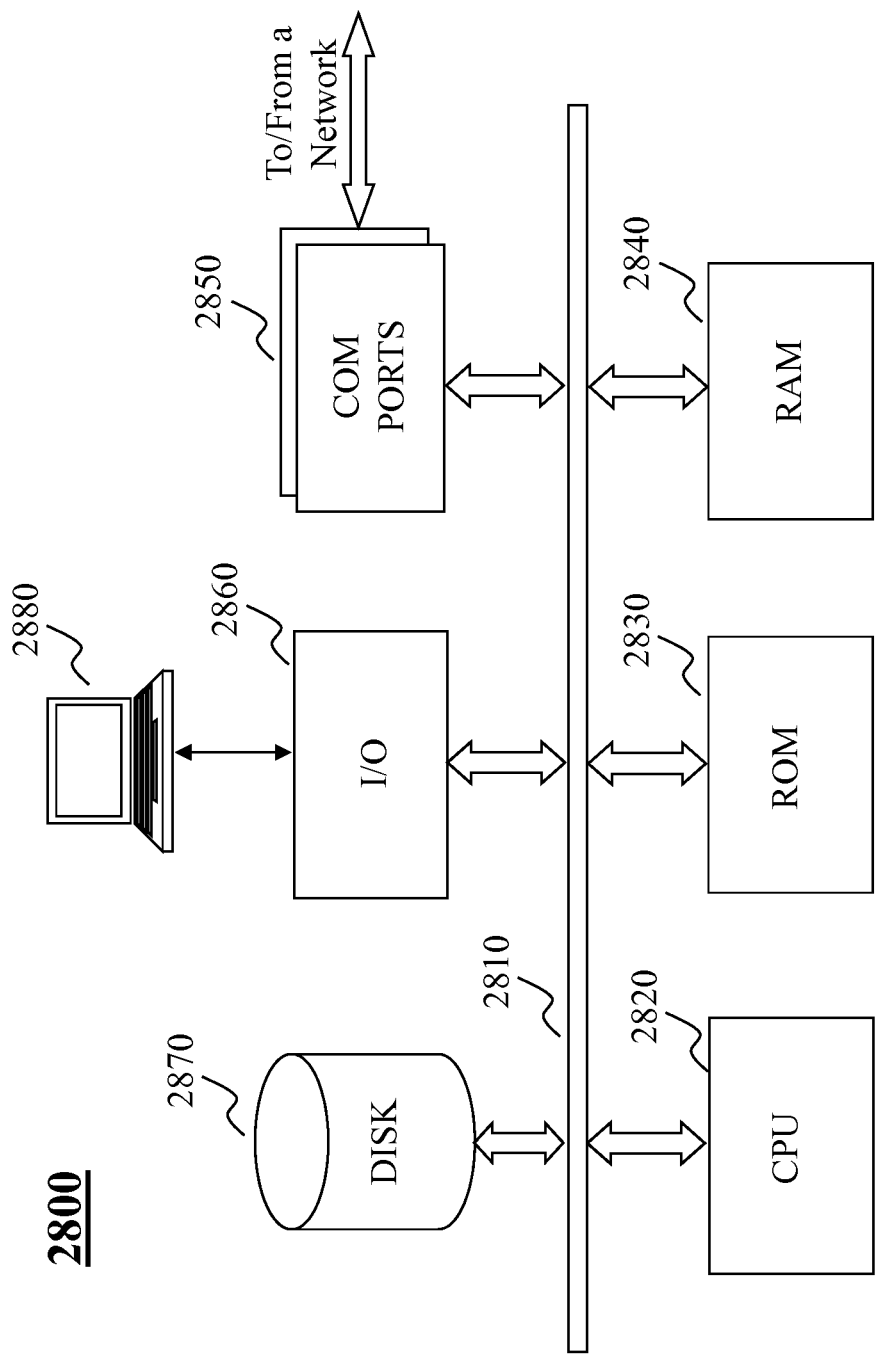

SYSTEM AND METHOD FOR FINANCIAL MANAGEMENT

CROSS-REFERENCE TO RELATED APPLICATIONS

This application claims priority of U.S. Provisional Application No. 61/926,631 filed on Jan. 13, 2014 the entire contents of which are incorporated herein by reference.

TECHNICAL FIELD

This disclosure relates generally to financial management, and in particular, financial management using a network-based, e.g., Internet-based, portal or application.

BACKGROUND

The use of cash or currency is being increasingly replaced by the convenience afforded by payment cards, such as credit, debit, and pre-paid cards, including virtual or mobile cards and tokenization, as well as electronic funds transfers, e.g. electronic checks or online funds transfer services such as PayPal™. Merely by way of example, many children, however, do not have the requisite accounts needed to complete such transactions, e.g. access to/the ability to open and maintain payment cards or funds transfer accounts, and often do not even have a bank account (e.g. savings, checking) into which to receive funds or monetary gifts, e.g., those from relatives or friends, or from these residing in countries using different currencies.

For instance, card and electronic funds transfer (EFT) accounts used by children are those of a parental account, or a sub-account that is linked to or associated with a primary account held by the parent (or guardian). That is, while the child (or any other dependent) may be able to use or is authorized to initiate charges using such a payment system, the parent (or guardian) is ultimately responsible for paying for such charges. Accordingly, it may be desirable to exert some level of control over the types of purchases or transactions a child is permitted to make using a parental or subsidiary account.

Various Internet websites may be used to purchase goods through the use of a payment card or electronic funds transfer (EFT) system (e.g. PayPal™). In order to purchase goods, the purchaser must typically enter his/her card or account information for each purchase. However, many children do not have their own payment accounts. Some parents may choose to let their children borrow their own cards/accounts for specific purchases. Alternatively, some parents may either provide their children with their own (sub-account) cards or purchase pre-paid cards for their children. While this may work for a few instances, it is not a viable option with the rapid growth of websites, online games and online applications appealing to children and the ever-increasing online footprint of children. Fearing unlimited access to the Internet and usage of the card or account, a parent may be hesitant to give his or her card or account to a child without supervision.

These systems may also be troubling since they often provide no control or limitation on what, where, when or how much the child may purchase or transact, or in general, volunteer (confidential) personal or financial information. Further, it is often difficult for a parent to track the amount of purchases made from each website by a child, for each child, and/or how much he or she is spending, and as such, may not become aware of such transaction at least until the credit card bill is received at the end of the billing cycle.

With the rapid proliferation of websites, online games, and online applications designed for children under 14, there is also a need for a system that parents may setup and children may use to purchase goods and services while limiting or obviating a child's need to provide their personal information. Thus, a system is needed that may enable a parent to manage a child's access and personal information provided to websites, or in the alternative provide parental consent to the collection and use of certain necessary information as well as to control how money is spent by a child.

One other area of concern in online financial transactions is the issue of protecting the privacy/personal information of minors, particularly children under 14, from financial institutions, vendors and other service providers. Examples of children's privacy information include date of birth, email addresses, telephone numbers, physical address, and purchase history. There is a need to impose access controls so only the public portion of any account is visible to financial institutions, vendors and other service providers, unless explicit authorization from the parent(s) is granted to access this information or the information shared is in a form that is not personally identifiable.

Further, typically, a parent, other family member or friend may wish to give a gift to a child in the form of cash, which may saved and/or later be used by that child to purchase goods or services. It is often difficult for parents to maintain these funds segregated from their own until the point at which the child wishes to spend the money and to keep track of how much money the child has spent. Therefore it is difficult for the parents, the child and the gift-giver to be certain that the gifted money has been utilized by the child as intended.

Some retailers, service providers and websites enable such a person to purchase a gift card, which may be redeemed by a recipient, e.g., a child. However, such gift cards are often mailed to the recipient in order for him to receive it. As a result, there is a risk that the gift cards may not be received. Alternatively, gift cards may be lost by the recipient, and therefore may be inappropriate for certain individuals such as young children.

Additionally, gift cards are typically purchased on a periodic basis, e.g. for holidays or birthdays when a one-time gift is intended. However, in many instances an individual, such as a parent, may wish to give a repeated or recurring gift over a period of time to another individual, such as a child. Additionally, if a parent wishes to limit a child's use of the money to or a child wishes to spend his money on certain particular websites, the parent would have to purchase gift cards for each website, or for a single week's allowance, or for a larger sum intended to cover multiple weeks. Additionally, by relying on gift cards, the child is limited to spending the funds and with that particular vendor. Thus, the child may not learn (or have an incentive) to save his or her money as a parent or even another gift-giver may have intended.

Alternatively, as parents and children acquire more and more cards from issuers and vendors, managing these cards may become a burden. Physical cards take space, and often only a small number of cards may be carried in one's wallet. One may try to squeeze many cards in his wallet. It is often frustrating for him to find and extract a card to use and squeeze it back into the crowded wallet after use. Less frequently used cards often have to be stored somewhere other than in one's wallet, and it is an additional challenge to have the right card for the right occasion.

Furthermore, generally, strict privacy regulations (prohibiting the sharing of the sensitive data to payment processors), age restrictions as well as a lack of any credit history (e.g. no regular income), prevent children from obtaining their own payment cards or electronic payment accounts. Alternatively, parents are often reluctant to obtain new cards as accepting a new card usually means carrying another card (i.e., another card to squeeze into a wallet) and/or to safeguard and keep track of, or replacing an existing card. Moreover, for the financial institutions or vendors, issuing a physical card carries costs related to their design, manufacturing, distribution, and operation.

Therefore, there is a need for a more secure, monitorable (in real time, for example) and controlled financial management mechanism for parents (or guardians) to allow their children or dependents to aggregate or segregate their own funds (e.g. from gifts or 'allowances') and to purchase goods and/or services on the Internet, or at physical stores or point-of-sales locations. Such a financial management mechanism may be used in other contexts, e.g., companies and their employees, sports or other clubs and their members.

SUMMARY

The present teaching relates to methods, systems, and programming for financial management. Particularly, the present teaching is directed to methods, systems, and programming for financial management using a network-based, e.g., Internet-based, portal or application.

In an example, a method, implemented on at least one machine each of which has at least one processor, storage, and a communication platform connected to a network for performing financial management is presented. A first set of rules associated with a first access credential to an account is provided. A second set of rules associated with a second access credential to the account is provided. The second set of rules is at least partially different from the first set of rules. An access credential is received from a first user of the account. A determination is made whether the received access credential matches the first access credential. A first request related to the first user with respect to a transaction is received, and information regarding the transaction is extracted. At least one action is determined with respect to the first request based on the information and the first set of rules.

In a different example, a system having at least one processor, storage, and a communication platform for financial management is presented. The system includes a rule database, a ruleset engine, and a transaction engine. The rule database is configured to store a first set of rules associated with a first access credential to an account and a second set of rules associated with a second access credential to the account. The second set of rules is at least is partially different from the first set of rules. The ruleset engine is configured to determine at least one action with respect to a request for a transaction related to a first user of the account based on the first set of rules and additional criteria. The transaction engine is configured to perform at least some of the at least one action.

Other concepts relate to software for implementing the present teaching on financial management. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a non-transitory machine readable medium having information recorded thereon for financial management is presented. The recorded information, when read by the machine, causes the machine to perform a series of processes. A first set of rules associated with a first access credential to an account is provided. A second set of rules associated with a second access credential to the account is provided. The second set of rules is at least partially different from the first set of rules. An access credential is received from a first user of the account. A determination is made whether the received access credential matches the first access credential. A first request related to the first user with respect to a transaction is received, and information regarding the transaction is extracted. At least one action is determined with respect to the first request based on the information and the first set of rules.

Additional features will be set forth in part in the description which follows, and in part will become apparent to those skilled in the art upon examination of the following and the accompanying drawings or may be learned by production or operation of the examples. The features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 28 depicts the architecture of a computer which may be used to implement a specialized system incorporating the present teaching.

DETAILED DESCRIPTION

Figure 1:
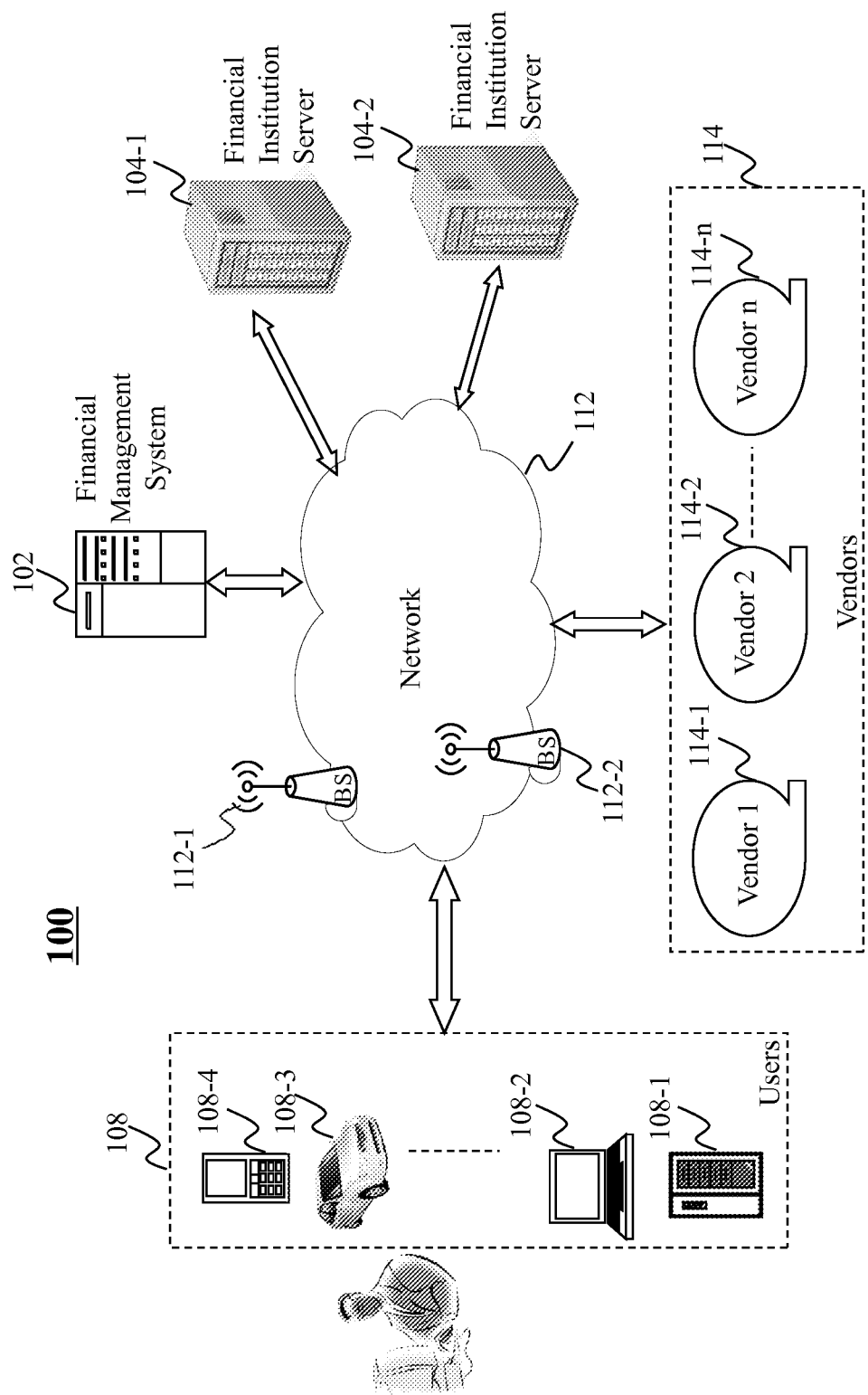
FIGS. 1 and 2 illustrate exemplary system configurations in which a financial management system may be deployed in accordance with various embodiments of the present teaching.

In the description that follows, to illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

The present disclosure generally relates to systems, methods, medium, and other implementations directed to financial management. The method and system, realized as a specialized and networked system by utilizing one or more computing devices (e.g., mobile phone, personal computer, etc.) and network communications (wired or wireless), relate to financial management, which in turn relates to the management of, e.g., a monetary account, transactions, budgets, or a combination thereof. The method and system involve an account (or a primary account and a secondary account (or sub-account)) accessible by various users (also referred to as account user) whose access privileges are defined by rules. As used herein, a user may be an administrator, or an authorized user. An administrator may refer to one who set up an account, and have the authority to use the account, and grant access privilege to an authorized user, and/or define or revise rules applicable to the authorized user. The rules may further describe what actions are needed for various users to complete various transactions. The method and system disclosed herein allow aggregation and/or segregation of users' own funds (e.g. from deposits, funds transfer, gifts or 'allowances'), facilitate and/or impose limitations on purchase of goods and/or services on the Internet, or at physical stores or point-of-sales locations. The method and system may provide a more secure, monitorable (in real time, for example), and controlled financial management mechanism applicable in many contexts including, for example, parents (or guardians) and their children or dependents, companies and their employees, or the like.

For example, the method and system disclosed herein may allow purchase transactions to be completed in a more secure manner with appropriate tracking and verification with no physical card or static account number to be lost or stolen. In some embodiments, the method and system disclosed herein involves using a pre-funded account and related payment card (or an account with different access privileges). The system is available to people with any or no credit history/score and carries reduced or no default risk (as with a credit card) for the issuer. If a debit card is not used, the account according to an embodiment of the present teaching is also not subject to different regulations. The ability to segregate, e.g., parent and child, monies and facilitate gift-giving (vs. cashing checks in a child's name into a parent's account to be comingled with but then distributed to the child later) is disclosed herein. Other applicable contexts include, e.g., company and employee, sports or other clubs and their members, a primary account holder and a secondary account holder (or an administrator and an authorized user of an account), where the aggregation and segregation of funds may be desirable. The method and system may provide access to a new or under-accessed customer base. For instance, the method and system facilitate establishing a child's own savings and purchase history. As another example, the method and system provide access by commercial enterprises to children under the age of 14 while meeting applicable regulations, e.g., Children's Online Privacy Protection (COPPA) terms. The method and system allow monitoring of spending/transactions on and by a user, e.g., a child, and the creation and facilitation of educational/teachable moments.

In some embodiments, a financial management system (including, e.g., a portal or an application) disclosed herein may be implemented as a website accessible through the Internet on an electronic computing device, or may be a stand-alone application installed on the electronic computing device, where the application may exchange data with other devices over the network on an as-needed basis. In some embodiments, a computer-readable medium including computer-executable instructions or information to provide and implement one or more aspects of a financial management system is provided. The instructions or information, when executed by a processor, may cause the processor to implement one or more methods and/or systems presented in this disclosure.

In some embodiments, the financial management system may be implemented as or accessed from a website, a mobile application, or a stand-alone software application, having a user interface (in the form of, e.g., an application or portal) through which a user (e.g., a parent, a company) may create an "account" with one or more profiles (or access privileges) with specific login information or access credentials (for himself and for one or more authorized users, e.g., children or dependents, one or more employees). The financial management system may link or associate a primary account accessible by a user with a secondary account (or a sub-account) accessible by the same user or a different user. The primary account and the secondary account (or the sub-account) may provide different privileges. Merely by way of example, the user of the primary account may prescribe rules regarding who, when, how, and/or the amount of funds that may be deposited into and/or dispensed from the primary account and/or the secondary account (or the sub-account), approve or reject a transaction associated with the primary account and/or the secondary account (or the sub-account); a user of the secondary account (or the sub-account) may lack the privilege to access the primary account, may need to limit transactions to what is available in the secondary account (or the sub-account), or may need an approval from the user of the primary account to proceed in a transaction associated with the secondary account (or the sub-account). In some embodiments, there are no separate primary account and secondary account (or sub-account); there is one account with different profiles (including, e.g., access privileges, rules of using the account) that are similar to the different privileges associated with the primary account and the secondary account (or the sub-account) described above. For simplicity and illustration purposes, the following description is provided in connection with the embodiments that there is one account with different profiles for different users. It is understood that it is not intended to limit the scope of the disclosure.

In an exemplary context of parent and child, through a user interface of the financial management system (e.g., a website, an application or portal), a parent may be able to set various controls and permissions for any financial transactions that an authorized child may do using funds available to the account. Additionally, the parent may also be able to monitor and/or configure rules associated with the account within the financial management system to need prior approval for, restrict, and/or get notifications about any transactions done related to the account. Further, the website or application may be configured to facilitate (purchase or other financial) transactions by exchanging financial information, information regarding one or more "permission" rules configured in respect of the child and/or other information, with a vendor (e.g., an online vendor or a physical vendor location), as well as with the associated card processor, electronic funds transfer (EFT) company or financial institution, and enabling transferring of funds or payment for a purchase using a payment card or electronic funds transfer authorized for the child. The portal website or application may also be configured to allow a parent and/or a child to configure rules with respect to one or more entities or users that may contribute/add funds to the account, and also allow to generate a transaction identifier to be used by the child to complete a transaction. The financial management system may allow the parent to create different rules for different users of the account, e.g., different children, different fund contributors, or the like. The following description regarding the financial management system is provided in the exemplary context of parent and child. It is understood that the financial management system may be applicable in contexts other than the exemplary context of parent and child. The exemplary context is used for illustration purposes, and not intended to limit the scope of the disclosure.

The financial management system may include or be associated with one or more engines or modules configured to provide specific functionalities discussed in detail later in this disclosure including, but not limited to, a signup engine, a ruleset engine, a transaction engine, a monitoring module, and a notification engine.

These and other objects, features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended as a definition of the limits of the invention. As used in the specification and in the claims, the singular form of "a", "an", and "the" include plural referents unless the context clearly dictates otherwise.

Figure 2:
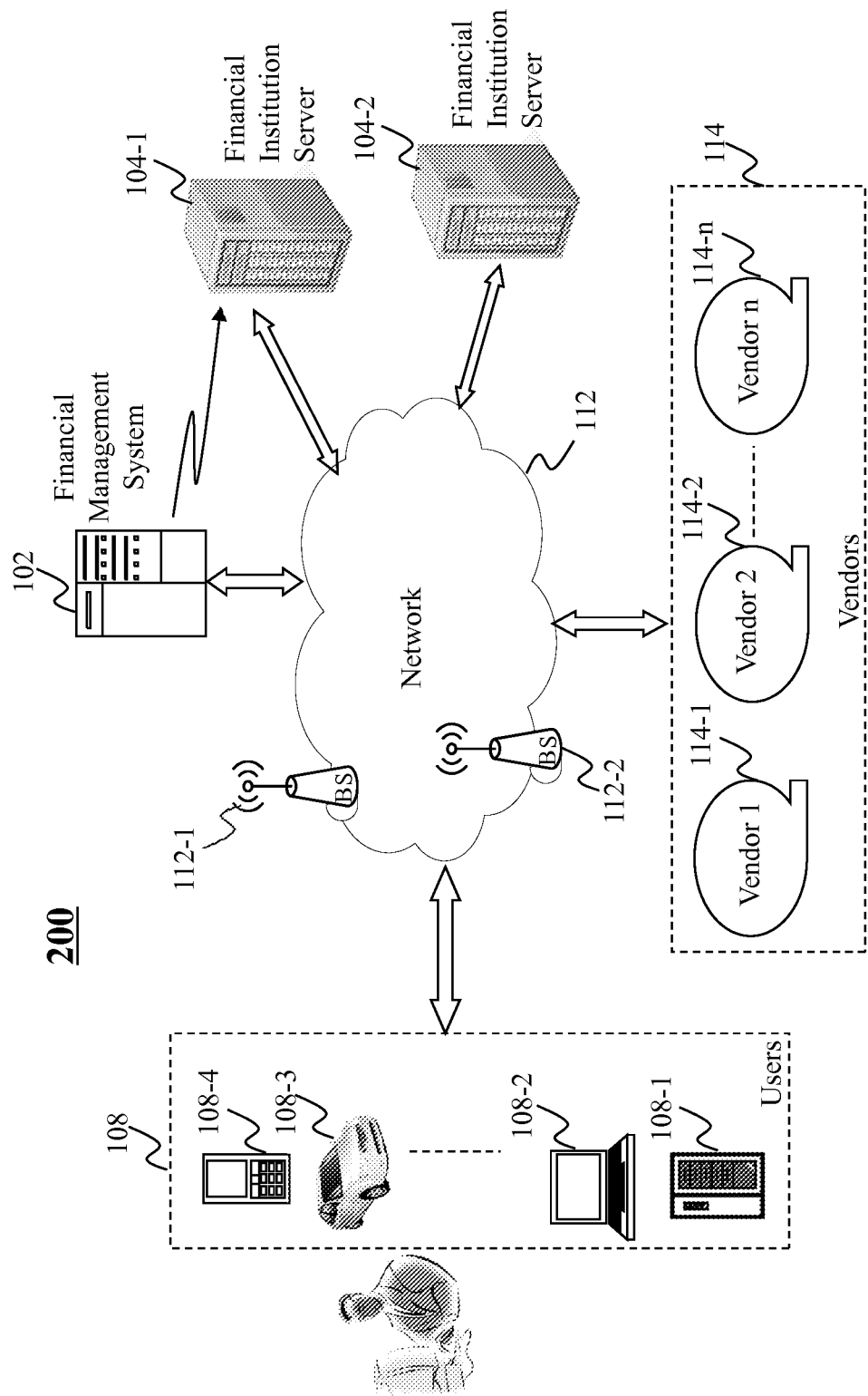

FIGS. 1 and 2 illustrate exemplary system configurations in which a financial management system may be deployed in accordance with various embodiments of the present teaching. In FIG. 1, the exemplary networked environment 100 includes a financial management system 102, financial institutions (or their servers) 104, one or more users 108, a network 112, and vendors 114.

The network 112 may be a single network or a combination of different networks. For example, the network 112 may be a local area network (LAN), a wide area network (WAN), a public network, a private network, a proprietary network, a Public Telephone Switched Network (PSTN), the Internet, a wireless network, a virtual network, or any combination thereof. The network 112 may also include various network access points, e.g., wired or wireless access points such as base stations or Internet exchange points 112-1, . . . , 112-2, through which a data source may connect to the network 112 in order to transmit information via the network 112.

Users (including, e.g., user devices) 108 may be of different types such as users connected to the network 112 via desktop computers 108-1, laptop computers 108-2, a built-in device in a motor vehicle 108-3, or a mobile device 108-4. A user 108 may use the financial management system 102 via the network 112. Merely by way of example, a user 108 may send a request for a transaction to and proceed in the requested transaction based on rules associated with the user of the financial management system 102 via the network 112. As another example, a user 108 may receive notifications about and monitor activities with respect to an account by one or more users of the account. A user 108 may be an electronic computing hardware device capable to processing and communicating data with other devices through one or more wired or wireless networks (including the Internet, cellular networks such as GSM, GPRS, 2.5G, 3G, 4G networks, and/or other networks), and may have location determining and tracking components (e.g., based on Geographical Positioning System (GPS) technologies), in accordance with the principles of the present disclosure. In the embodiment illustrated in FIG. 1, the financial management system 102 directly connects to the network 112. For example, an independent service provider with the financial management system 102 may serve multiple financial institutions (or their servers) 104 or multiple vendors 114 via the network 112.

The vendors 114 include multiple vendors 114-1, 114-2, . . . , 114-n. A vendor 114 may correspond to a website hosted by an entity, whether an individual, a business such as Amazon.com, or an organization such as USPTO.gov, a content provider such as cnn.com and Yahoo.com, a social network website such as Facebook.com, a gaming website, or the like. The financial management system 102 may access information from any of the vendors 114-1, 114-2, . . . , 114-n. For example, the financial management system 102 may fetch general information regarding a vendor 114 (e.g., types of products or services available, etc.), a transaction-specific information from a vendor 114 (e.g., the price of a product or service, the number of transactions with the vendor 114 within a period of time, etc.). A vendor may be a website, a physical store, or an entity where and with whom a financial transaction may be done.

FIG. 2 is a high level depiction of another exemplary networked environment 200 in which the present teaching is applied, according to an embodiment of the present teaching. The networked environment 200 in this embodiment is similar to the networked environment 100 in FIG. 1, except that the financial management system 102 in this embodiment directly connects to the network 112, and also serves as a backend sub-system to at least one of the financial institutions (or their servers) 104. For example, an independent service provider with the financial management system 102 may serve the financial institution (or its server) 104-1 and other financial institutions (or their servers) including 104-2 via the network 112.

In some embodiments, a user 108 or a vendor 114, may be embodied in an electronic, computing and communication hardware device of one of various forms. Such a device may be a mobile phone, a tablet computer, a personal computer, a server, a laptop, a smartphone, a gaming device, a networking device, or a wearable computing device in the form of a wrist watch, a bracelet, a pair of headphones, a pair of eyeglasses and/or other wearable computing devices. A user 108 or a vendor 114 may include one or more hardware, firmware and/or software processor to implemented and execute various operations configured therein.

In some embodiments, a user 108 or a vendor 114 includes a display device, an input device, an output device, a memory, a system-on-chip (SoC) chipset including a processor, a communication/network module, and an antenna. One or more of these devices may also include a bus and/or other interconnection means to connect and communicate information between various components or units of the one or more devices.

A display device may be configured to display information to a user 108 or a vendor 114. The display device may include a liquid crystal display (LCD), a light emitting diode (LED)-based display, or any other flat panel display, or may use a cathode ray tube (CRT).

An input device may include alphanumeric and other keys which may be inputted via a keyboard, touch screen (e.g., with haptics or tactile feedback), speech input, eye tracking input, a brain monitoring system, or other comparable input mechanism. The input information received through the input device may be communicated to a processor of the SoC, e.g., via a bus, for further processing. Another type of the input device may include a cursor control device, such as a mouse, a trackball, or cursor direction keys to communicate direction information and command selections, e.g., to the SoC and to control cursor movement on a display device.

A memory (or another part of system 100/200) may be a dynamic storage device configured to store information and instructions to be executed by the processor of the SoC and/or other processors (or computing units). The memory may also be used to store temporary variables or other intermediate information during execution of instructions by the processor(s). Part of or the entire memory may be implemented as Dual In-line Memory Modules (DIMMs), and may be one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. The memory may also include read-only memory (ROM) and/or another static storage device configured to store static information and instructions for the processor of the SoC and/or other processors (or computing units). Further, the memory may include a magnetic disk, optical disc or flash memory devices to store information and instructions.

The electronic storage media of any device of the system 100/200 may include one or both of a system storage (e.g., a disk) that is provided integrally (i.e. substantially non-removable) with the device and/or removable storage that is removably connectable to the device via, for example, a port (e.g., a USB port, a firewire port, etc.) or a drive (e.g., a disk drive, etc. The electronic storage media of any device of the system 100/200 may include or be connectively operational with one or more virtual storage resources (e.g., cloud storage, a virtual private network, and/or other virtual storage resources).

In some embodiments, the SoC is part of a core processing or computing unit of the device, and is configured to receive and process input data and instructions, provide output and/or control other components of the system 100/200 in accordance with embodiments of the present disclosure. In some embodiments, the SoC may include a microprocessor, a memory controller, a memory, and a peripheral component. The microprocessor may further include a cache memory (e.g., SRAM), which along with the memory of the SoC may be part of a memory hierarchy to store instructions and data. The microprocessor may also include one or more logic modules such as a field programmable gate array (FPGA) or other logic array. Communication between the SoC's microprocessor and memory may be facilitated by the memory controller (or chipset), which may also facilitate in communicating with the peripheral component, such as a counter-timer, a real-time timer, a power-on reset generator, or the like, or a combination thereof. The SoC may also include other components including, but not limited to, a timing source (e.g., an oscillator, a phase-locked loop, or the like), a voltage regulator, a power management circuit, or the like, or a combination thereof.

In some embodiments, different components of or related to the financial management system 102 (e.g., a user 108, a vendor 114) may communicate with one another directly or via one or more networks via a communication platform.

The communication platform may include appropriate and/or typical hardware, software and/or firmware modules, e.g., a modulator, a demodulator, a baseband converter, a channel codec, and/or other components, implemented therein to enable the device for wireless communication. As such, the communication platform may wirelessly transmit and receive data and messages in the form of radio frequency (RF) signals through an antenna. In some embodiments, the communication platform is designed and configured to support communication based on one or more communication standards and protocols including, but not limited to, Wi-Fi, Wi-Gi, Bluetooth, GSM, CDMA, GPRS, 3G or 4G (e.g., WiMAX, LTE) cellular standards, Wireless USB, satellite communication, and Wireless LAN. Additionally or alternatively, the communication platform may also be configured for wired communication, e.g., based on the Ethernet standard, and as such, may be coupled to an appropriate network interface of the device.

In some embodiments, the financial management system 102 may allow one or more users, e.g., the administrator, an authorized user, to set up, maintain, or access a savings or savings-like account, through which transactions including payments or electronic funds transfer (EFT) provided by and/or under the control of the financial management system 108 may be processed. The funds in the account may be handled by the financial management system 102 using a financial institution, e.g., a bank, a card processor, or an electronic funds transfer processing company. For instance, the financial management system 102 may have the funds saved in a traditional bank savings account with a traditional bank. However, the administrator or an authorized user of the account does not deal with the financial institution directly. In some embodiments, the financial institution does not have access to information of the administrator or an authorized user of the account in the financial management system. The financial management system may pool funds from different accounts with the financial management system and handle them by, e.g., saving them in a traditional bank savings account in the name of the financial management system 102 or a related entity. To process a transaction related to one or more users of the account, the financial management system 102 may communicate and exchange information (e.g., financial information, etc.) with the financial institution (e.g., a bank, a card processor, or an electronic funds transfer processing company) via, e.g., the Internet, and/or any other wired or wireless network. Additionally, the financial management system 102 may communicate and exchange information with one or more online vendors or websites, e.g., to process a purchase transaction performed thereon related to one or more account users. Further, the financial management system 102 may communicate a notification, an alert, and/or a message with one or more users of the account within the financial management system. Merely by way of example, the financial management system 102 may send a text message to one or more devices (e.g., cellphones) of the administrator (e.g., a parent), when a fund is transferred or received or an authorized user (e.g., a child) makes a purchase using the payment system associated with the account. This may allow the administrator of the account to control, track, and monitor financial transactions initiated on behalf of or by the authorized user, or furnish teaching/learning opportunities for responsible financial management with real (vs. virtual) funds and transactions.

In some embodiments, using a pre-funded account reduces or eliminates financial transaction fees, e.g. annual or monthly fees, loading fees, ATM withdrawal fees, late fees, interest charges, balance inquiry fees, replacement card fees, inactivity fees, or the like, or a combination thereof. In some embodiments, a separate website account associated with the financial management system may be established to hold account information, create dual-layer password protection, display transaction activities, link to a calendar (e.g. for birthdays), receive special offers, etc.

Figure 3:
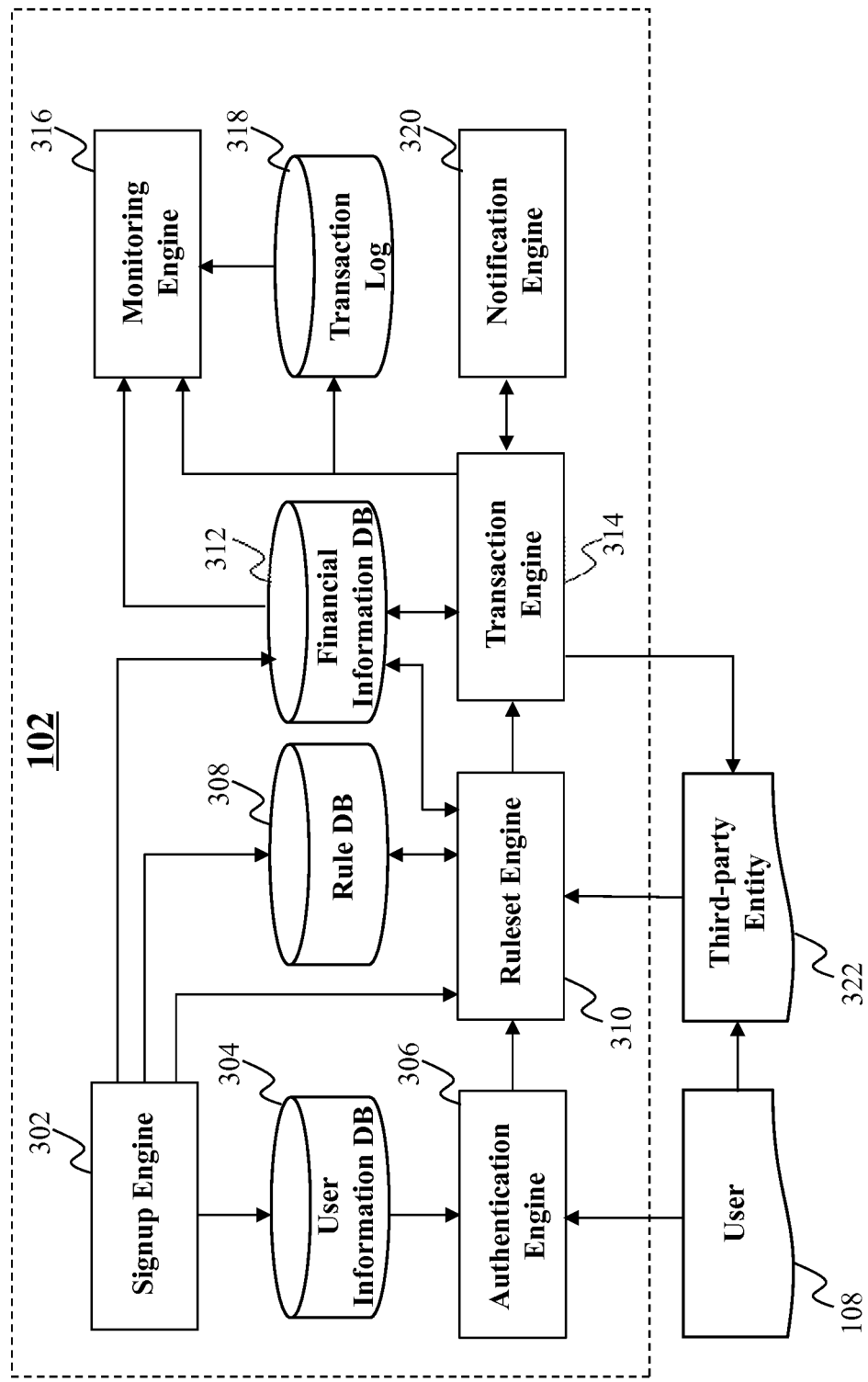
FIG. 3 illustrates an exemplary financial management system according to an embodiment of the present teaching.

FIG. 3 illustrates an exemplary financial management system 102. In this embodiment, the financial management system 102 includes a signup engine 302, a user information database (DB) 304, an authentication engine 306, a rule database (DB) 308, a ruleset engine 310, a financial information database (DB) 312, a transaction engine 314, a monitoring engine 316, a transaction log 318, and a notification engine 320. The system 102 may be accessed by a user 108, and/or a third-party entity 322. A third-party entity 322 may be a vendor (online or local) 114, a financial institution or its server 104, or the like. The financial management system 102 may be centralized or distributed.

The financial management system 102 may be briefly described as follows. The signup engine may be configured to allow a user (e.g., a parent) of the financial management system 102 to set up an account within the system 102. The authentication engine 306 may be configured to authenticate login information (or access credentials) provided by or related to the user 108. The ruleset engine 310 may be configured to determine actions with respect to a transaction related to the user 108 based on various criteria including, e.g., the transaction, his access privilege, applicable rules for using the account, financial information related to the user 108, or the like, or a combination thereof. The ruleset engine 310 may provide instructions regarding the actions with respect to the transaction related to the user 108 to, e.g., the transaction engine 314, which may proceed accordingly. The transaction may be, e.g., a purchase transaction, a savings transaction, a one-time or recurring deposits (by way of, e.g., funds transfer), or the like, or a combination thereof. The transaction engine 314 may communicate with the monitoring engine 316, the transaction log 318, and/or the notification engine 320 regarding the transaction.

Figure 4:
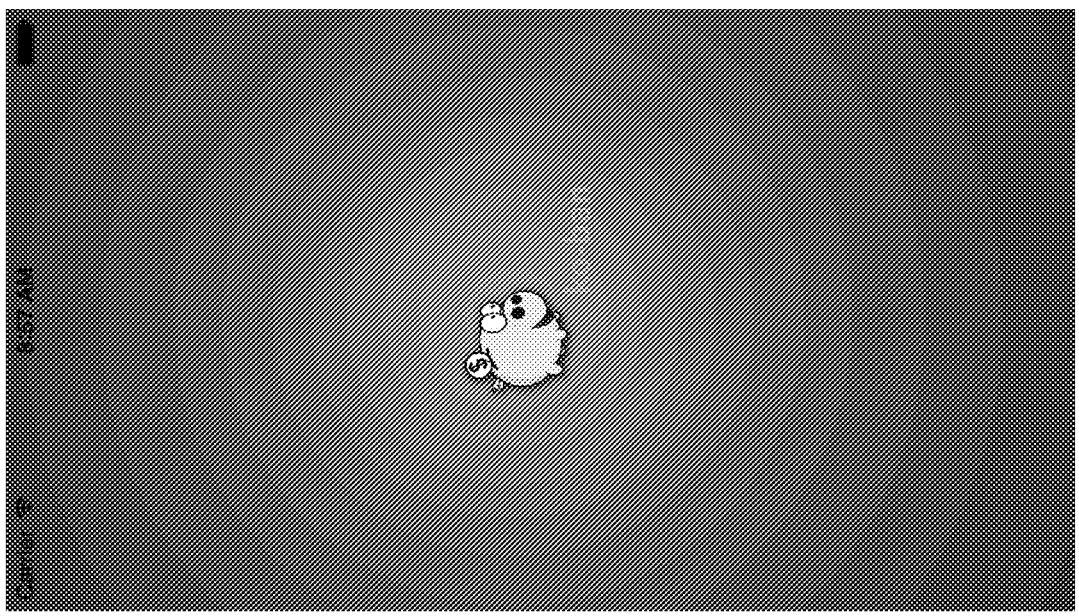
FIG. 4 illustrates an exemplary splash screen of an application that constitutes a user interface of a financial management system according to an embodiment of the present teaching.

FIGS. 4-7 show exemplary pages of an application (referred to as the financial management application) that constitutes a user interface of the financial management system 102 according to an embodiment of the present teaching. FIG. 4 illustrates an exemplary splash screen of the financial management application. In this illustrated example, the financial management application is named "ko-ban." The application name may also be expressed as, e.g., "Ko-ban," "Ko-Ban," "KO-BAN," or the like. The screen may also show information including, e.g., time, battery life of the device on which the financial management application is being used, the carrier of the device on which the financial management application is being used, a link to terms and conditions of use of the financial management application, or the like, or a combination thereof.

Figure 5:
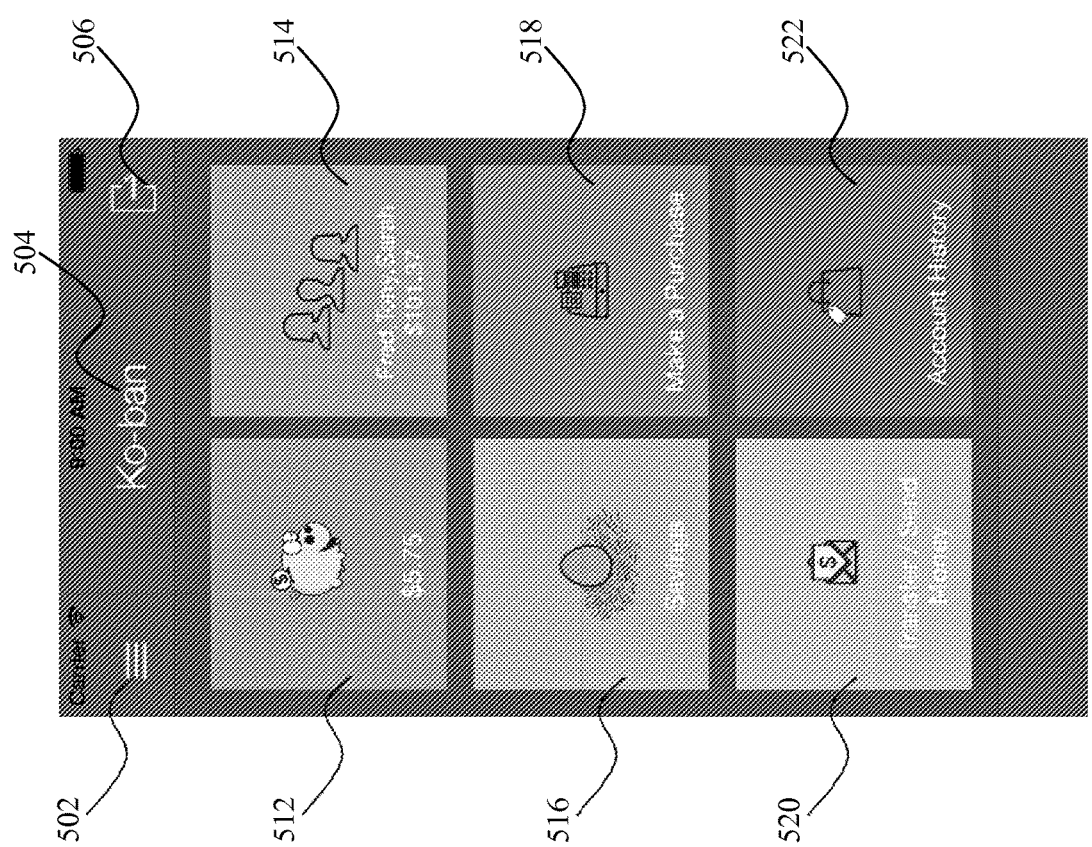
FIG. 5 illustrates an exemplary Home page of an application of a financial management system according to an embodiment of the present teaching.

FIG. 5 illustrates an exemplary Home page of a financial management application of a financial management system 102 according to an embodiment of the present teaching. The page includes a current balance icon 512, an icon regarding the total balance for some users 514 (e.g., children of the administrator of the account, as discussed later), a savings icon 516, a purchase icon 518, a deposit icon 520, and an account history icon 522. The Home page may also include a pull-down menu 502. The pull-down menu 502 may provide an alternative way to activate at least one of the functions related to the icons 512, 514, 516, 518, 520, and 522, or a way to activate additional functions. Exemplary additional functions include, e.g., print, save, mark a specific transaction, exit the financial management application, or the like. The Home page may further include an exit icon 506. Clicking the exit icon 506 may allow a user to exit the financial management application. The page may also show information including, e.g., the application name 504, time, battery life of the device on which the financial management application is being used, the carrier of the device on which the financial management application is being used, a link to terms and conditions of use of the financial management application, or the like, or a combination thereof.

The functions associated with the icons 512, 514, 516, 518, 520, 522, and 506, and the functions listed in the pull-down menu 502, may be activated by, e.g., clicking on the icon or the name of the function listed in the pull-down menu. The current balance icon 512 includes a summary of the current balance of the account. The icon 514 includes the names of some of the users (e.g., children of the administrator) and the total balance allocated to these users. In some embodiments, the current balance shown in the icon 512 does not include the balances shown in icon 514 that are already allocated to some users (e.g., children of the administrator) of the account, as illustrated in FIG. 5. In some embodiments, the current balance shown in the icon 512 includes the balances shown in icon 514 that are already allocated to some users of the account. In some embodiments, the icon 512 or the icon 514 does not show the balance but briefly describe the function associated with the icon, like icon 516, 518, 520 or 522. In some embodiments, user names are not shown in the icon 514; alternatively, the number of the (children) users, and/or a designated image (e.g., pictures of the (children) users), is shown in the icon 514.

The savings icon 516 is associated with the savings, including a savings plan, associated with an account user. The purchase icon 518 may be associated with the functions of making a purchase by an account user. The deposit icon 520 may be associated with the functions of making a deposit or a funds transfer by an account user. The account history icon 522 may be associated with the functions of showing the history of the account, e.g., transaction history, by one or more account users. As discussed below, different users of the account may have different access privileges. The Home page of the financial management application for different users may show the same icons, or different icons. Merely by way of example, for an account user who has access privilege of using the savings function and the purchase function of the account, only those two icons and the account history icon 522 are visible and clickable. As another example, the same icons are visible to all account users; however, only icons associated with applicable functions are clickable to activate the applicable functions. The arrangement of the icons, as well as the images showing on the icons, are for illustration purposes, and are not intended to limit the scope of the disclosure.

Figure 6:
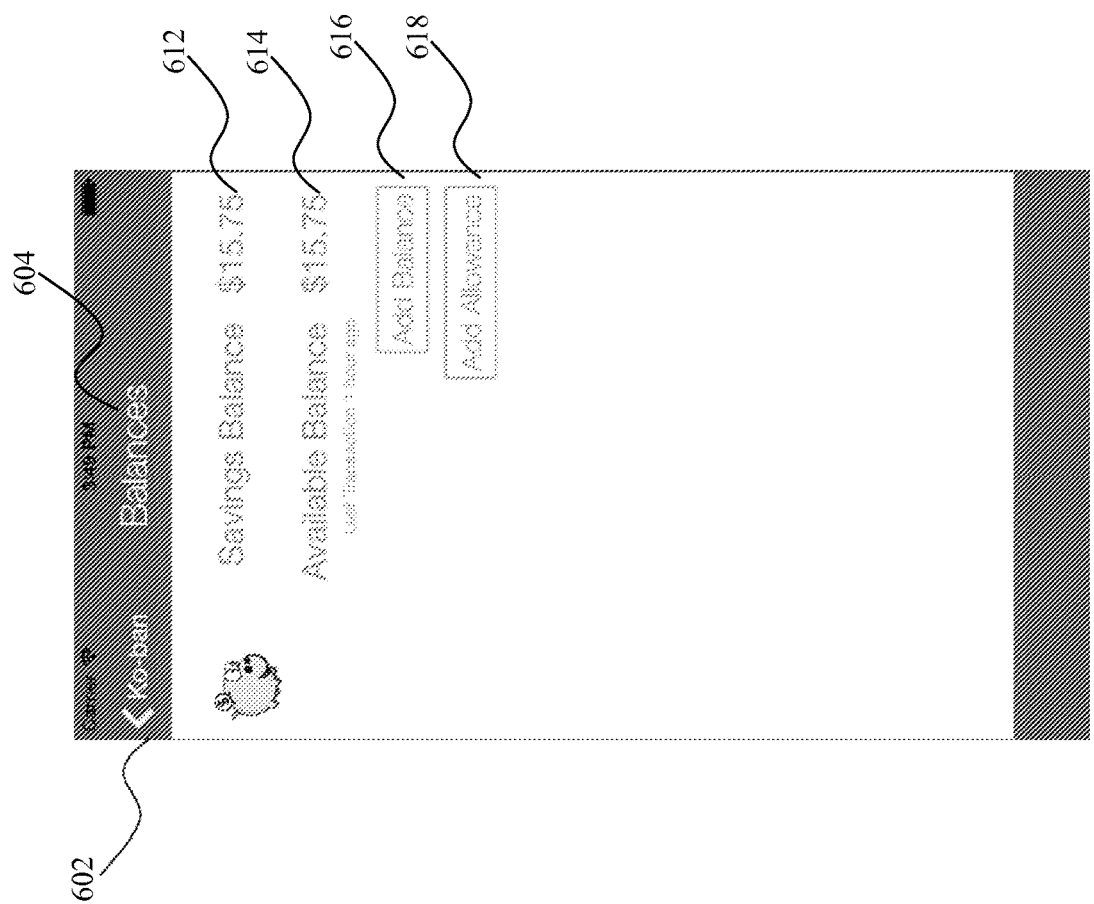
FIG. 6 illustrates an exemplary Balance page of an account user of a financial management system according to an embodiment of the present teaching.

FIG. 6 illustrates an exemplary Balance page for an account user of a financial management system according to an embodiment of the present teaching. An account user (with appropriate access privilege) may reach the Balance page by, e.g., clicking on the icon 512 on the Home page of the financial management application. The page shows a title 604 of the page, Saving Balance 612, Available Balance 614, an "Add Balance" icon 616, and an "Add Allowance" icon 618. The "Savings Balance" 612 may include the total balance available to the account user or the balance in the account user has set aside for savings. The "Available Balance" 614 may include the balance available for the account user to spend. The "Savings Balance" 612 and the "Available Balance" 614 may be the same or different. The "Add Balance" icon 616 may be associated with the function of adding funds to the account user, e.g., when the balance available to the account user is low or as a gift. The "Add Allowance" icon 618 may be associated with the function of revising (e.g., increasing or decreasing) the allowance or one-time or recurring funds transfers applicable to the account user. The page also includes an icon 602 that a user may click to go back to a previous page or the Home page of the financial management application. The page may further show information including, e.g., time, battery life of the device on which the financial management application is being used, the carrier of the device on which the financial management application is being used, recent account activities, a link to terms and conditions of use of the financial management application, or the like, or a combination thereof. Merely by way of example, the page may include a message "Last Transaction 1 hour ago" as illustrated in FIG. 6.

Figure 7:
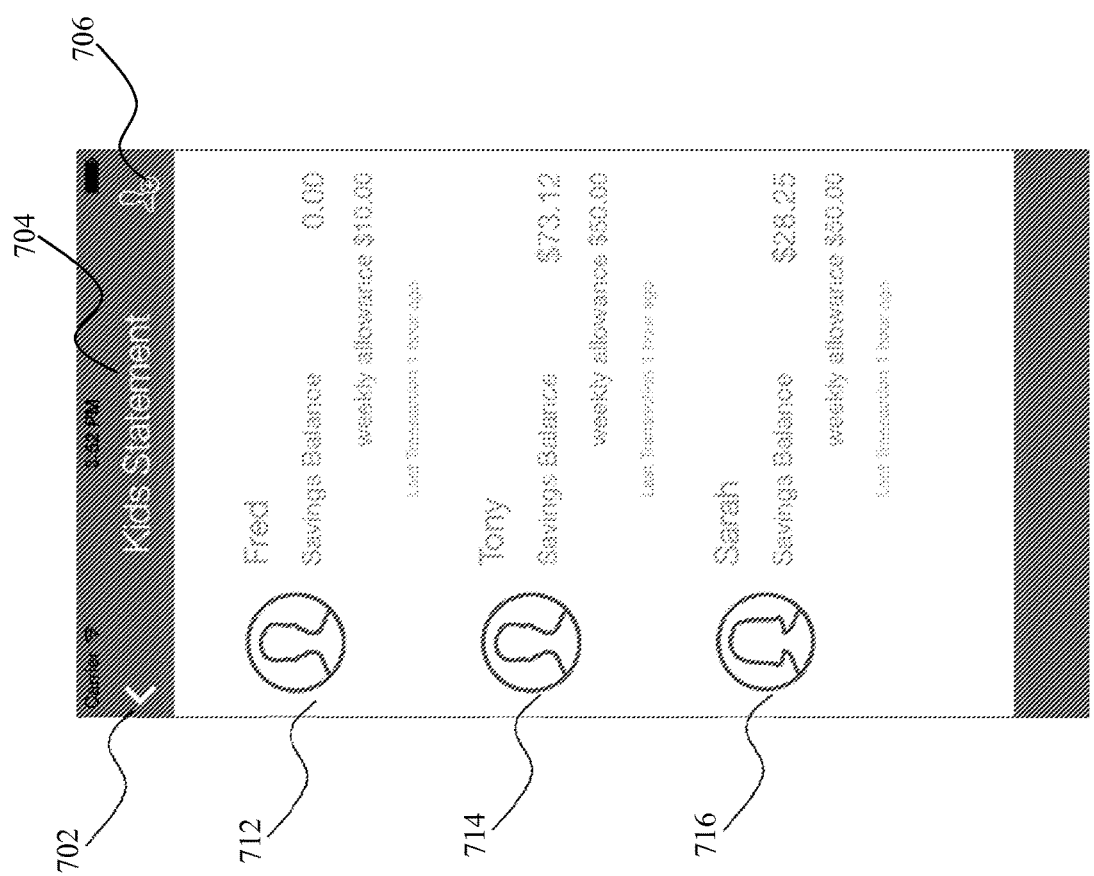
FIG. 7 illustrates an exemplary Statement page of an account of a financial management system according to an embodiment of the present teaching.

FIG. 7 illustrates an exemplary Statement page of an account of a financial management system according to an embodiment of the present teaching. An account user (with appropriate access privilege) may reach the statement page by, e.g., clicking on the icon 514 on the Home page of the financial management application. The statement page lists at least some users of the account, e.g., the children of the administrator of the account. In the page, an entry, e.g., 712, 714, or 716, may be provided for a user included in the statement page. The summary may include information regarding, e.g., user name, Savings Balance, weekly allowance, recent activities, or the like, or a combination thereof. Various financial information including, e.g., the balance associated with an account user, may be stored in the financial information database 312. An entry, e.g., 712, 714, or 716, may also include a picture of or a cartoon representing the user. An entry, e.g., 712, 714, or 716, or a part thereof (e.g., the user name, or the picture or cartoon), may be clickable to lead to a page providing more details (e.g., transaction history) regarding the activities of the account user. The page also includes an icon 702 that a user may click to go back to a previous page or the Home page of the financial management application. The page may further show information including, e.g., the title of the page 704, time, battery life of the device on which the financial management application is being used, the carrier of the device on which the financial management application is being used, recent account activities, a link to terms and conditions of use of the financial management application, or the like, or a combination thereof. Still further, the page may include an icon 706 associated with the functions of adding a user to the account.

Figure 8:
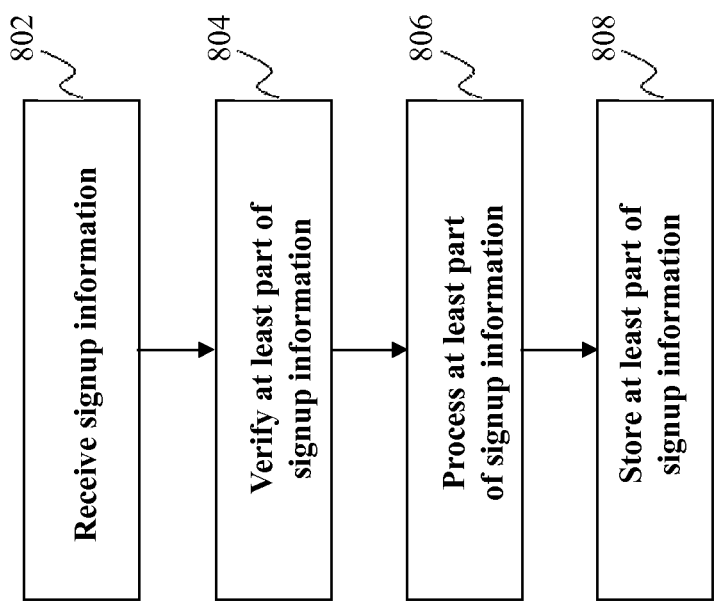
FIG. 8 illustrates a flowchart of an exemplary signup process, according to an embodiment of the present teaching.

Returning to FIG. 3, the signup engine 302 may be configured to allow a user (e.g., a parent) of the financial management system 102 to set up an account within the system 102. FIG. 8 illustrates a flowchart of an exemplary signup process, according to an embodiment of the present teaching. A user who signs up for an account may designate himself as the administrator of the account. The administrator may need to provide various signup information. The administrator may provide signup information via a user interface, e.g., a website, phone, an application or portal, or the like, or a combination thereof. The user interface may be configured to guide the administrator of the account through the setup of the account by, e.g., asking for, verifying, and storing signup information about the administrator and other authorized users.

At 802, signup information is obtained. Signup information may include, e.g., personal information, financial information, information regarding one or more additional authorized users, login information (or access credentials), rules of using the account applicable to different users, or the like, or a combination thereof.

Personal information may include, e.g., name, birthday, age, gender, social security number or another identification number, address, email, a primary phone number, a mobile phone number, verification preference (such as email, phone, or text that is used to verify the signup information related to the administrator), notification preference (such as email, phone, or text that is used to send a notification related to the account to the administrator), a primary email address, one or more password reminder questions, timezone (such that dates and times in the account are based on the specified time-zone and not the time-zone of the financial management system 102), currency preference, and/or other preferences or information, or the like, or a combination thereof. Financial information may include, e.g., income, credit card number, debit card number, banking account number, PayPal™ or other electronic account information, or the like, or a combination thereof. The administrator may also specify one or more authorized users of the account other than himself, e.g., a child, a dependent, a relative, a friend, an employee, or the like, or a combination thereof.

The administrator may share administrator access privilege or authorities with one or more authorized users. This may be achieved by that the administrator shares his login information or access credentials with another authorized user, or the administrator specifies the login information or access credentials for the other authorized user and prescribes the same (or almost the same) access privilege and applicable rules as those of the administrator. The administrator may revoke the sharing of the administrator access privilege or authorities by, e.g., changing the administrator login information (or access credentials) or changing the access privilege and applicable rules with respect to the other authorized user.

The administrator may specify login information or access credentials for each of the one or more authorized users. For different authorized users, the login information or access credentials may be different. The administrator may also prescribe access privileges, and/or rules of using the account applicable to the one or more authorized users. The respective access privileges and applicable rules of using the account may be associated with the login information or the access credentials. Merely by way of example, when a user logs in using the login information or access credential belonging to the administrator, the access privilege and rules prescribed to the administrator are applicable; when a user logs in using the login information or access credential belonging to an authorized user, e.g., a child of the administrator, the access privilege and rules prescribed to the specific user are applicable.

The login information (or access credentials) for the administrator or an authorized user may include a user name, a password, a pin number, or the like, or a combination thereof. A password may be a series of numbers, letters, symbols, or an identifier (e.g., a bio-metric identifier). A bio-metric identifier may be, e.g., fingerprint, voice, facial recognition, or the like, or a combination thereof. A password may have an expiration date and need to be reset from time to time (e.g., periodically or as often as the administrator specifies or wishes) to insure password strength.

In some embodiments, the administrator may configure a profile for an authorized user (e.g., a child of the administrator, a grandparent, a friend, etc.) by prescribing rules with regard to the use by the authorized user of the account. An authorized user may be one who may make a deposit to the account (also referred to as a contributor), or one who may make a purchase or use the funds in the account. The profile may include login information (or access credentials) as already discussed, conditions or limitations on access to the funds available to the account by the authorized user, conditions or limitations on contributing or depositing funds to the account, or the like, or a combination thereof. The administrator may be able to set and update or change varying levels of access privilege (or "permissioning" features) allowing the authorized user to have full to no discretion over spending on the account, e.g., to control where, when, what, how much the authorized user may spend funds available in the account, or make a deposit into the account.

In some embodiments, the administrator may specify that the administrator is the sole provider of funds into the account. In some embodiments, the administrator may designate one or multiple authorized user(s) (e.g., a grandparent, a relative, a friend, etc.) as an approved contributor(s) (who may make a deposit to the account), frequency, and amount of the deposit to the account or to another authorized user (e.g., a child). The administrator may specify that a notification be sent for a deposit or transfer of funds into the account. A notification may be sent by email, SMS/text message, voicemail, etc. The administrator may also specify that a notification of receipt of the funds be sent to the contributor who contributes or deposits the funds. Further, the administrator may impose one or more conditions on how a deposit may be made to the account. For example, the administrator may designate a monetary limit that a contributor may add to the account or contribute to an authorized user of the account. As another example, the administrator may limit the frequency with or time period (e.g. birthday, holiday) within which a contributor may deposit money into the account or contribute to an authorized user of the account. An authorized user or contributor who may make a deposit into the account may be provided with an authorization code that he may use to make a deposit.

For example, for an authorized user, the administrator may specify a list of approved vendor websites or store locations where the authorized user may spend money, a spending limit (per transaction, per vendor, etc.) that limits the amount of money that the authorized user may spend without obtaining an approval by, e.g., the administrator, or a periodic spending limit applicable to the authorized user (e.g., per day, per week, per month, or over any particular time limit), or a time period during which the authorized user may spend money in the account, e.g. certain hours of the day, certain days of the week, or any period so desired. As another example, the administrator may set a spending limit that controls the amount of money the authorized user may spend on an occasional basis, such as the authorized user's birthday or a holiday, and when the authorized user is visiting a specific place or a geographical location. As a further example, the administrator may restrict the spending by the authorized user to a geographic region (e.g., home zip code).

In some embodiments, the administrator may preemptively block purchases from pre-identified vendors (e.g., vendor websites), identify vendors from which purchases by or on behalf of the authorized user need pre-approval, limit purchases to only certain pre-approved vendors, limit purchases to only certain products or services offered by certain vendors, or allow full automatic approval from a limited number of or all vendors. In some embodiments, the administrator may approve transactions related to an authorized user based on a spending amount (e.g. a maximum amount in a single transaction), on a periodic basis (e.g. a total allowable spending amount per month), on an occasional basis (e.g. for a birthday or holiday), a savings account balance limit (e.g. below which the savings account may not fall). In some embodiments, the administrator may (e.g., instantly) lock or suspend the access privilege by an authorized user after occurrence of an objectionable activity.

Any combination of these rules may also be specified in relation to the profile of an authorized user being configured by the administrator.

In some embodiments, a business profile may be created to manage vendors (e.g., third-party vendors), based on the types of products or services offered, locations, hours of operation, contact and/or customer service information, or the like, or a combination thereof. Vendors 114 may include, but are not limited to, Amazon.com, iTunes, Best Buy, Apple Store, Toys 'R Us, Starbucks, bookstores, or the like. The embodiments of the invention are not limited by the type of service or good being offered by a vendor. The business profile may be applicable to one or more authorized users of the account. For instance, the business profile includes information regarding a vendor, with which any transaction by or on behalf of an authorized user needs to be approved by the administrator of the account.

In some embodiments, an authorized user may be allowed or limited to adding an item(s) to a "wish list," instead of directly requesting payment using the account. In some embodiments, a wish list may include a pending item regarding which the transaction has not been completed. Merely by way of example, an item is pending because prior approval, e.g., by the administrator, is needed before the authorized user may purchase it. The wish list may include an item from a specific vendor. Merely by way of example, the wish list may include a video game from Amazon.com (regardless of whether the video game is also available at another vendor). The wish list may include multiple items from the same or multiple vendor(s). The wish list may include an item without specifying a vendor providing the same. Merely by way of example, the wish list may include a cell phone; the cell phone may be available at various local or online vendors, and the wish list does not include information specifying from which vendor the cell phone may be or has to be purchased. The transaction(s) related to an item(s) in the wish list may be subsequently completed after a condition is satisfied according to rules prescribed by the administrator. In some embodiments, an account user, e.g., the administrator of the account, may review and approve (or disapprove) the item(s) on the wish list. After an item in the wish list is approved, the transaction to purchase the item may be completed. The payment to complete the transaction may be from the authorized user who has requested the item or added the item to the wish list, from the account user who has approved the item, or from another user of the account who has appropriate access privileges. In some embodiments, the account user, e.g., the administrator of the account, may remove the item(s) from the wish list. The item(s) may be removed from the wish list if it is disapproved by the account user, e.g., the administrator of the account. The wish list may be customized, e.g. an item(s) in a wish list may expire and be removed from the wish list based on the settings of the wish list.

An exemplary set of rules applicable to an authorized user, e.g., a child, as prescribed by the administrator are as follows. A child may use his user name and password to access the account, review his account balances, set savings goals, or purchase goods or services that are approved by the administrator through the financial management system 102. The child may also view/monitor his own past transactions, view various constraints/settings configured by the administrator, and set budgets for himself within the constraints set by the administrator. The settings of a child profile may be accessible, viewable, revisable, and/or controllable by the administrator. For example, the system may present a number of options from which the administrator may choose such that various controls/constraints may be imposed on a child with respect to transactions or purchases performed by the child using the account.

Listed below are exemplary rules according to an embodiment of the present teaching.

```
"name": "Transaction Deposit Minimum",
"description": "Block Transactions Below Value",
"priority": 2,
"on":1,
"condition":
    function(transaction,cb) {
        cb(transaction && (transaction.Total <
        DEPOSIT_MINIMUM);
    },
"consequence":
    function(cb) {
        system.log("Rule matched, blocks transactions below value. Rejecting deposit.");
        this.result = false;
        this.process = true;
        cb( );
    }
```

At 804, at least some of the signup information is verified before the administrator may proceed further in the signup process or the information is stored in a database. Merely by way of example, address, email address, phone number, or other personal information may be verified before the administrator may proceed further in the signup process or the information is saved in the user information database 304. As another example, credit card number, debit card number, banking account number, or other financial or account information may be verified before the information is saved in the financial information database 312. The signup engine 302 may perform verification electronically and/or automatically. For instance, the signup engine 302 may verify credit card information provided by the administrator by electronically sending the credit card information to the issuer of the credit card. Additionally or alternatively, the signup engine 302 may request supporting documents from the administrator or a different account user. For instance, the signup engine 302 may request that the administrator provide a phone bill or banking account statement or proof of custody or guardianship of a child for verification purposes.

At 806, at least some of the signup information may be processed before it is saved in a database of the financial management system 102. Exemplary ways of processing include encryption, compressing, or the like, or a combination thereof. For instance, a credit card number provided by the administrator may be encrypted before it is saved in the financial information database 312. Information transmitted to and from the financial management system 102 (e.g., that relates to the financial management application executing thereon) may be encrypted and secure using known encryption and any authentication algorithm, e.g., Secure Sockets Layer (SSL), Transport Layer Security (TLS), etc.

At 808, at least some of the signup information is stored in a database of the financial management system 102. In some embodiments, the personal information and/or login information (or access credentials) may be stored in the user information database (DB) 304; the rules of using the account applicable to different users may be stored in the rule database (DB) 308; the financial information may be stored in the financial information database (DB) 312. In some embodiments, the rules of using the account applicable to different users may be forwarded to the ruleset engine 310, and then forwarded to and saved in the rule database (DB) 308. In some embodiments, the rules of using the account applicable to different users may be retrieved or activated by the login information (or access credentials) provided by a user when he logs in. In some embodiments, at least some of the signup information may be transmitted to a secure database server (including relevant known hardware and software) operatively in communication with the financial management system 102 for storage and future access.

In some embodiments, signup information may be revised, and relevant database(s) be updated accordingly, after the account has been created. Merely by way of example, a new user may be added to the account based on appropriate information including, e.g., user name, access privilege, login information (or access credentials), applicable rules, or the like, or a combination thereof. As another example, rules associated with an existing user may be revised. E.g., revisions may be made regarding an allowance available to a user that may be increased or decreased, allowed frequency at which a user may make purchases, the upper limit of the amount a user may use in a purchase, the circumstances under which an approval is needed before a user may make a purchase, etc. As a further example, an account from which a deposit into the account of the financial management system may be added or deleted; or user information may be revised to reflect a change in, e.g., address, phone number, email, etc.

Figure 9A:
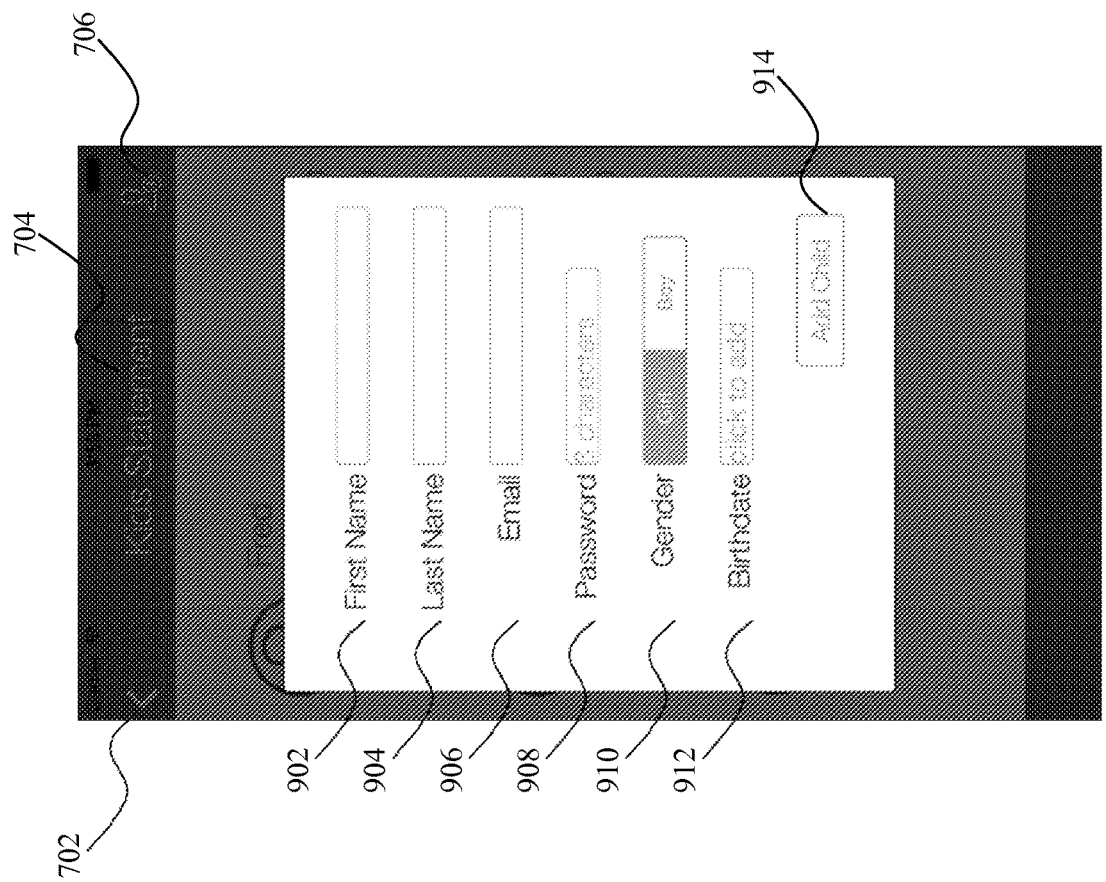
FIG. 9A illustrates an exemplary page where a new account user (e.g., a child) may be added to an account within a financial management system according to an embodiment of the present teaching.
Figure 9B:
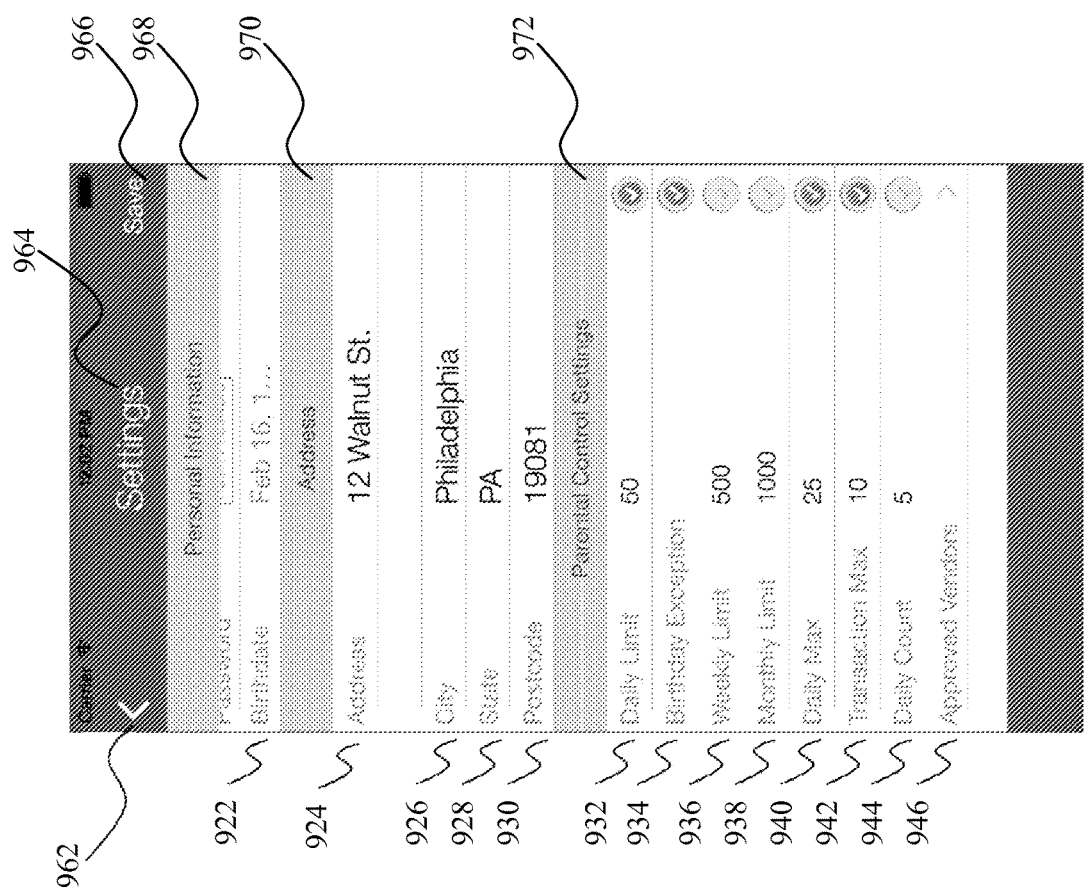
FIG. 9B illustrates an exemplary page where rules applicable to an account user may be set up within a financial management system according to an embodiment of the present teaching.
Figure 10:
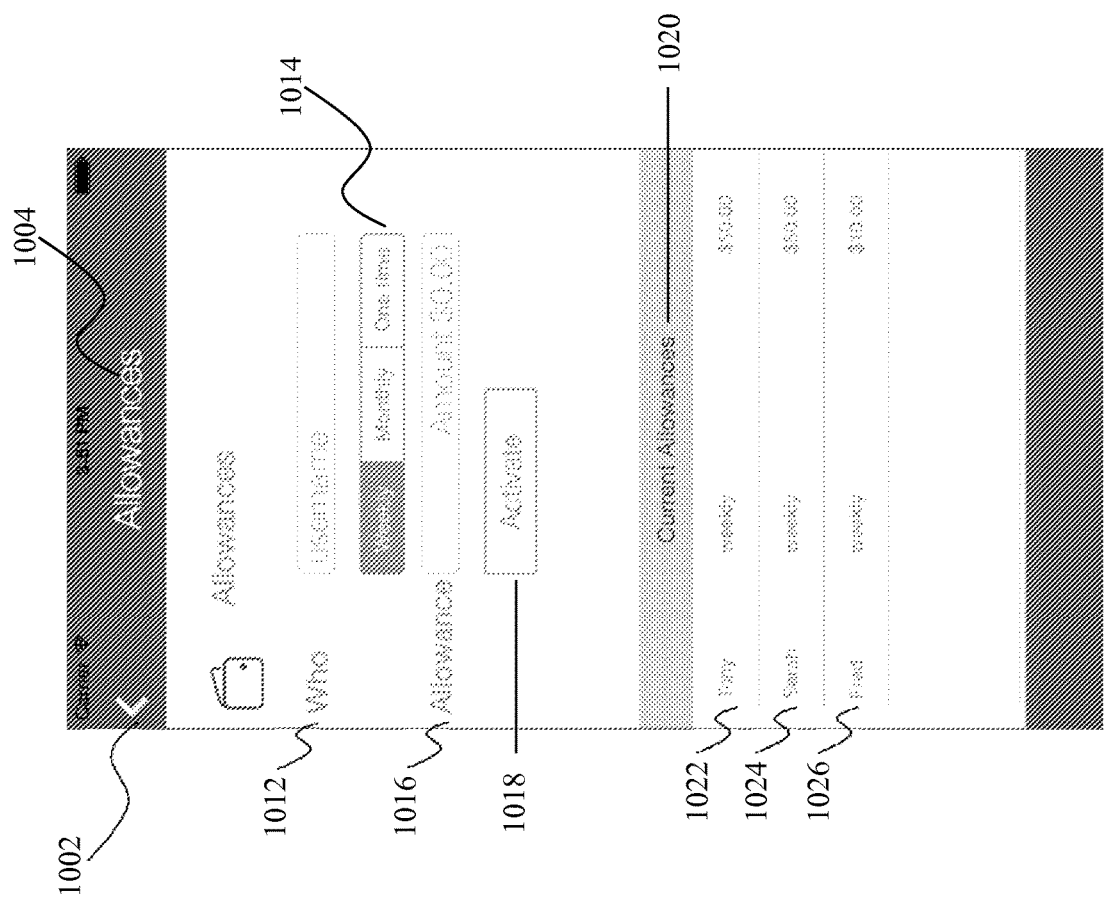
FIG. 10 illustrates an exemplary page where Allowances to an account user may be set up in an account within a financial management system according to an embodiment of the present teaching.

FIGS. 9A, 9B, and 10 show exemplary signup pages of an application that constitutes a user interface of the financial management system 102 according to an embodiment of the present teaching. FIG. 9A illustrates an exemplary page where a user (e.g., a child) may be added to a financial management system according to an embodiment of the present teaching. As illustrated, the page to add a user may be activated by clicking on the icon 706 on the Statement page. As discussed in connection with FIG. 7, the Statement page also includes an icon 702 that a user may click to go back to the Home page of the financial management application, and the title of the page 704. To add a new user, the administrator (or a user of the account with appropriate access privilege) may provide the following information regarding the new user, the first name (at 902), the last name (at 904), the email (at 906), the password (at 908), the gender (at 910), and the birthday (at 912). The administrator may click the "Add Child" icon at 914 to send the information to the financial management system 102. The new user may change the password after his profile has been set up, which would not impact the administrator's access to the user's profile.

FIG. 9B illustrates an exemplary page where rules applicable to an account user may be set up within the financial management system 102 according to an embodiment of the present teaching. The administrator (or a user of the account with appropriate access privilege) may provide the following information regarding a user: personal information (at 968), address (at 970), and personal control settings or rules (at 972). The user whose information is being provided may be a new user, or an existing user (such that the existing user's profile is being revised). The personal information 968 may include, e.g., user name, password, birthday (at 922), or the like, or a combination thereof. The address 970 may include, e.g., street number 924, apartment number, city 926, state 928, postcode 930, country, or the like, or a combination thereof. The parent control settings may include, e.g., a daily limit 932, a birthday exception 934, a weekly limit 936, a monthly limit 938, a daily max 940, a transaction max 942, a daily count 944, and approved vendors 946. The daily limit 932, the weekly limit 936, and the monthly limit 938 may specify the daily, weekly, and monthly spending limit, respectively, with respect to the user. The birthday exception 934 may specify whether a birthday exception exists so that the spending related to the user's birthday is not counted toward other limits (e.g., daily limit, weekly limit, or monthly limit) or rules in the parental control settings 972. The daily max 940 may specify the daily spending limit with respect to a specific category (e.g., gaming, food, clothes, or the like). The transaction max 942 may specify the maximum amount allowed in a single transaction, e.g., without an approval by the administrator. The daily count 944 may specify the limit for the number of transactions a day. The approved vendors 946 may provide a list of vendors that the parent has pre-approved so that the user does not need to seek approval by the administrator for transactions with the vendors. The parental control settings 972 may include further rules. For example, the parental control settings 972 may include a list of prohibited vendors or products and services. The parental control settings 972 may also restrict the financial management system 102 from being used by a certain authorized user during a particular time period, e.g. during school hours, or set a maximum amount of time during a particular time period that the system 102 may be used, e.g. an hour per week. In some embodiments, the administrator is allowed to use options provided by the financial management system 102 or the financial management application (e.g., those listed in the parent control settings 972 in FIG. 9B). Only the checked limits or rules are applicable. As illustrated, the daily limit 932, the birthday exception 934, the daily max 940 and the transaction max 942 are applicable with respect to the user. In some embodiments, the administrator is allowed to define his own rules in addition to or instead of the options provided by the financial management system 102 or the financial management application. The page further includes an icon 962 that a user may click to go back to a previous page or the Home page of the financial management application, and a save icon 966 that allows the information on the page to be saved. Still further, the page shows information including, e.g., the title of the page 964, time, battery life of the device on which the financial management application is being used, the carrier of the device on which the financial management application is being used, recent account activities, a link to terms and conditions of use of the financial management application, or the like, or a combination thereof.

FIG. 10 illustrates an exemplary page where Allowances to a user may be set up in a financial management system 102 according to an embodiment of the present teaching. To set up an allowance to a user, the administrator (or a user with appropriate access privilege) may provide the user name (at 1012), the frequency the allowance is to be provided (e.g., weekly, bi-weekly, monthly, one time) (at

1014), the amount (at 1016), or the like, or a combination thereof. Then the administrator (or a user with appropriate access privilege) may click the "Activate" icon 1018 to activate the allowance. This page may allow the administrator (or a user with appropriate access privilege) to add allowances to a new user, or to revise the allowances to an existing user. For an existing user, the allowance information currently provided may replace that already in the user's profile in the account. The administrator (or a user with appropriate access privilege) may be asked to confirm the intention to replace the allowance information already in the user's profile with newly provided information before the replacement occurs. The page also includes a summary of "Current Allowances" 1020 of account users in entries 1022, 1024 and 1026. For an account user, the summary may include the user name, the time period the allowance is applicable, and the amount of the allowance. The page further includes an icon 1002 that a user may click to go back to a previous page or the Home page of the financial management application. Still further, the page shows information including, e.g., the title of the page 1004, time, battery life of the device on which the financial management application is being used, the carrier of the device on which the financial management application is being used, recent account activities, a link to terms and conditions of use of the financial management application, or the like, or a combination thereof.

Returning to FIG. 3, the authentication engine 306 may be configured to authenticate login information (or access credentials) provided by the user 108. The authentication engine 306 may receive login information (or access credentials) provided by or related to a user 108. Merely by way of example, the login information (or access credentials) is entered by the user 108 trying to access his account in the financial management system 102. As another example, the login information (or access credentials) is provided by a software (e.g., a password management software) in which the login information (or access credentials) is saved. As a further example, the login information (or access credentials) includes two parts, one including username based login information provided by or related to the user 108, and the other including a keycode generated by the financial management system 102 (see, e.g., FIG. 26) based on the username based login information. The authentication engine 306 may compare the received login information (or access credentials) with those in the user information database 304. If a match is found, the user 108 may be granted access to the account to view account information (e.g., balance, transaction history, etc.), to perform a transaction, or the like, according to rules applicable to the user 108 determined by the ruleset engine 310.

Figure 11:
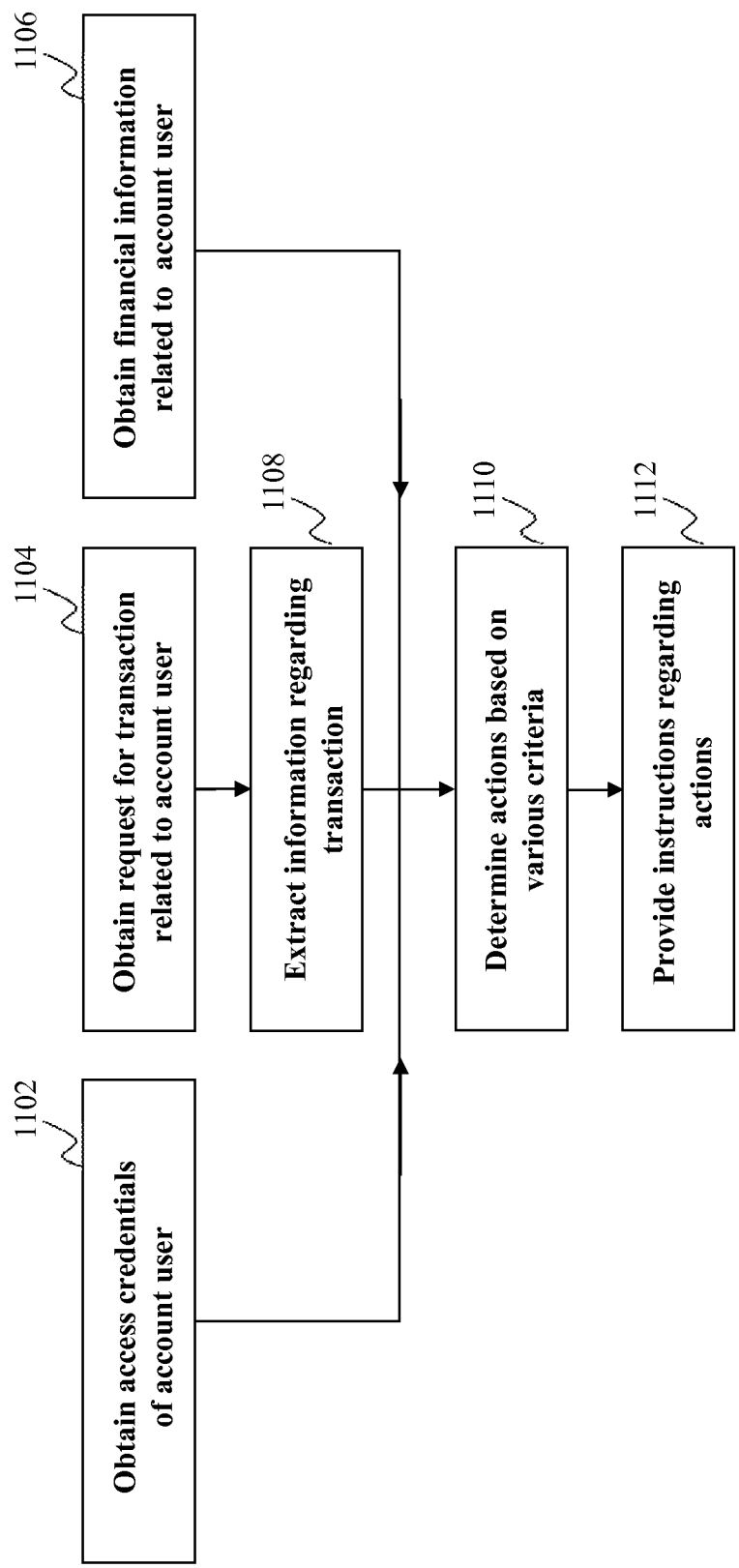
FIG. 11 illustrates a flowchart of an exemplary process for determining actions in the ruleset engine, according to an embodiment of the present teaching.

The ruleset engine 310 may be configured to determine actions with respect to a transaction related to the user 108 (e.g., an authorized user, or the administrator) based on various criteria including, e.g., the transaction, his access privilege, applicable rules for using the account, financial information related to the authorized user, or the like, or a combination thereof. FIG. 11 illustrates a flowchart of an exemplary process for determining actions with respect to a request related to an account user (e.g., the administrator, an authorized user) by the ruleset engine, according to an embodiment of the present teaching.

At 1102, the ruleset engine 310 obtains the login information (or access credentials) related to an account user. The login information (or access credentials) may have been verified in the authentication engine 306. The ruleset engine 310 obtains a request regarding the account related to the account user. The request may be that the account user wishes to view account information; the ruleset engine 310 then determines how much account information the account user has access to. The request may be that the account user wishes to revise rules applicable to another authorized user or add a new authorized user to the account, the ruleset engine 310 may determine the access privilege of the account user based on, e.g., the login information (or access credentials) provided by the account user. The request may be that the account user wishes to perform a transaction using the account. The transaction may be a deposit transaction, a purchase transaction with a vendor, or a saving transaction. The ruleset engine 310 may determine the amount, frequency and type of transactions permitted.

As illustrated at 1104, the ruleset engine 310 obtains a request for a transaction related to the account user. The request may be from the authorized user, or from a vendor in the case, e.g., that the transaction is a purchase from the vendor. At 1108, the ruleset engine 310 extracts or obtains information regarding the transaction. Such information may include, e.g., the type(s) of product(s) or service(s) the vendor provides, the price, the location, previous transactions the account user made with the vendor or similar vendors (based on information available in, e.g., the transaction log 318), or the like, or a combination thereof. At 1106, the ruleset engine 310 obtains financial information related to the account user. Such information may include, e.g., the amount of money available to the account user (based on information available in, e.g., the financial information database 312).

At 1110, the ruleset engine 310 may determine one or more actions with respect to the request related to the account user based on various criteria. Based on the login information (or access credentials), the ruleset engine 310 may retrieve the rules applicable to the account user from the rule database 308. Based on the information related to the transaction and the financial information related to the account user, the ruleset engine 310 may determine what actions are to be performed to proceed further with respect to the transaction according to the applicable rules. At 1112, the ruleset engine 310 may then forward instructions regarding the determined action(s). The instruction may be forwarded to, e.g., the transaction engine 314, to the signup engine 302 (in the case where the account user wishes to revise rules applicable to another authorized user or add a new authorized user to the account), or the like.

Figure 12:
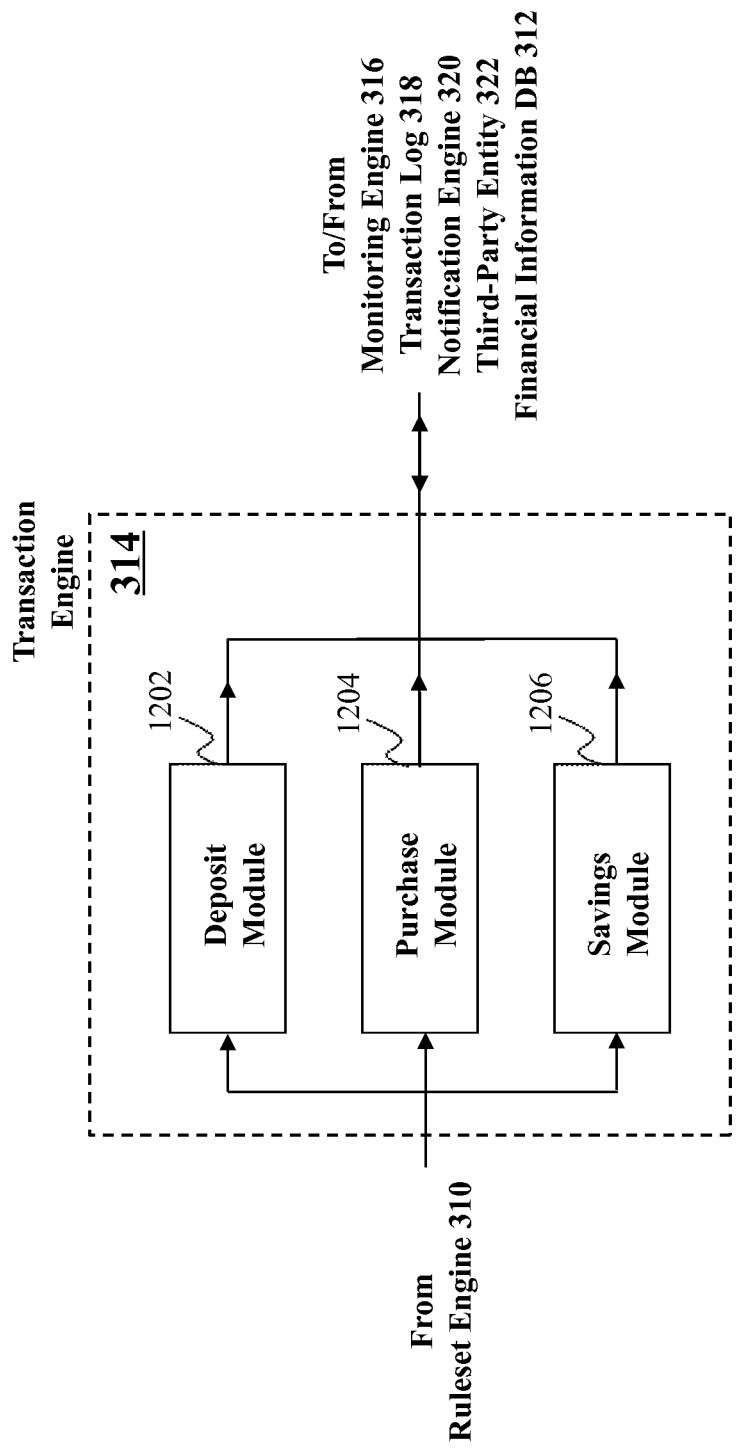
FIG. 12 illustrates an exemplary diagram of a transaction engine according to an embodiment of the present teaching.

As illustrated in FIG. 12, the instructions regarding at least one action with respect to a request for a transaction are forwarded to the transaction engine 314. The transaction engine 314 may include a deposit module 1202, a purchase module 1204, and a savings module 1206. The deposit module 1202 may be configured to handle a deposit transaction into the account related to an account user. The purchase module 1204 may be configured to handle a purchase transaction from the account related to an account user. The savings module 1206 may be configured to handle a savings transaction in the account related to an account user. An account user may be the administrator or an authorized user with appropriate access privilege regarding the specific transaction. The transaction engine 314 may be in communication with at least one of the following: the monitoring engine 316, the transaction log 318, the notification engine 320, the third-party entity 322, and the financial information database 312. Merely by way of example, the transaction engine 314 may request, based on the instructions from the ruleset engine 310, the notification engine 320 to send a notification or a request for approval for a transaction to, e.g., the administrator of the account. As another example, the transaction engine 314 may send information (e.g., the cost) regarding a transaction to the financial information database 312 so that the financial information related to the account user is updated and saved in the financial information database 312. As a further example, the transaction engine 314 may provide information regarding a transaction, e.g., the vendor, the time of transaction, or the like, to the transaction log 318.

Figure 13:
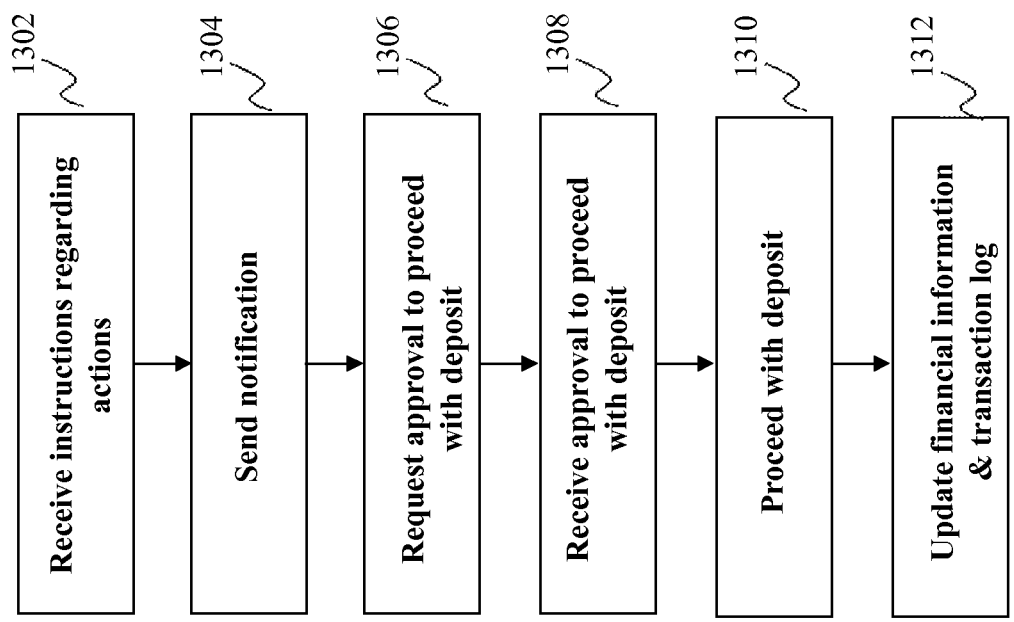
FIG. 13 illustrates a flowchart of an exemplary process for a deposit transaction according to an embodiment of the present teaching.

FIG. 13 illustrates a flowchart of an exemplary process for a deposit (also referred to as a deposit transaction) according to an embodiment of the present teaching. At 1302, instructions regarding at least one action to be performed with respect to a deposit transaction are obtained. According to the instructions, at least some of the at least one action (e.g., sending a notification regarding or a request for approval of a deposit, funds transfer or other actions related to the deposit, communicating with the financial information database 312, etc.) may be performed by the deposit module 1202. According to the instructions, at least some of the at least one action (e.g., funds transfer or other actions related to the deposit, etc.) may be performed by a service provider and/or a financial institution. The deposit module 1202 then proceeds according to the instructions. As illustrated, a notification regarding a request to make a deposit by a contributor (e.g., the administrator, an authorized user) is sent to, e.g., the administrator of the account, at 1304. A request for approval to proceed with the deposit is sent to, e.g., the administrator of the account, at 1306. If the approval is received at 1308, the deposit module 1202 may proceed further with the deposit at 1310. After the deposit is made, the financial information database 312 and/or the transaction log 318 may be updated accordingly at 1312. In some embodiments, some of the steps described above are not performed. Merely by way of example, no notification or approval by, e.g., the administrator may be needed before the deposit module 1202 may proceed further in the deposit transaction. As another example, if the request to make the deposit is rejected, the deposit transaction is aborted. A notification may be sent to the account user who has requested or initiated the deposit, and/or to the account user who has rejected the request for the deposit.

Figure 14:
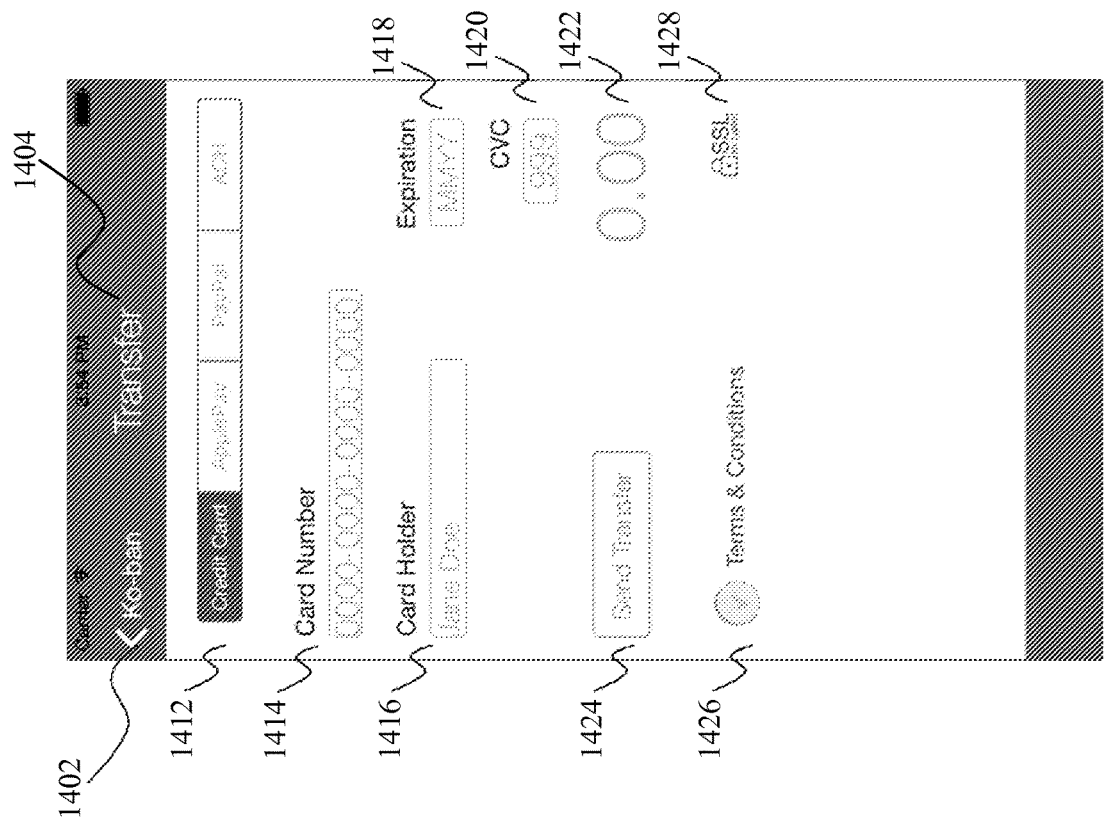
FIGS. 14 and 15 illustrate exemplary deposit pages of an account of a financial management system according to an embodiment of the present teaching.
Figure 15:
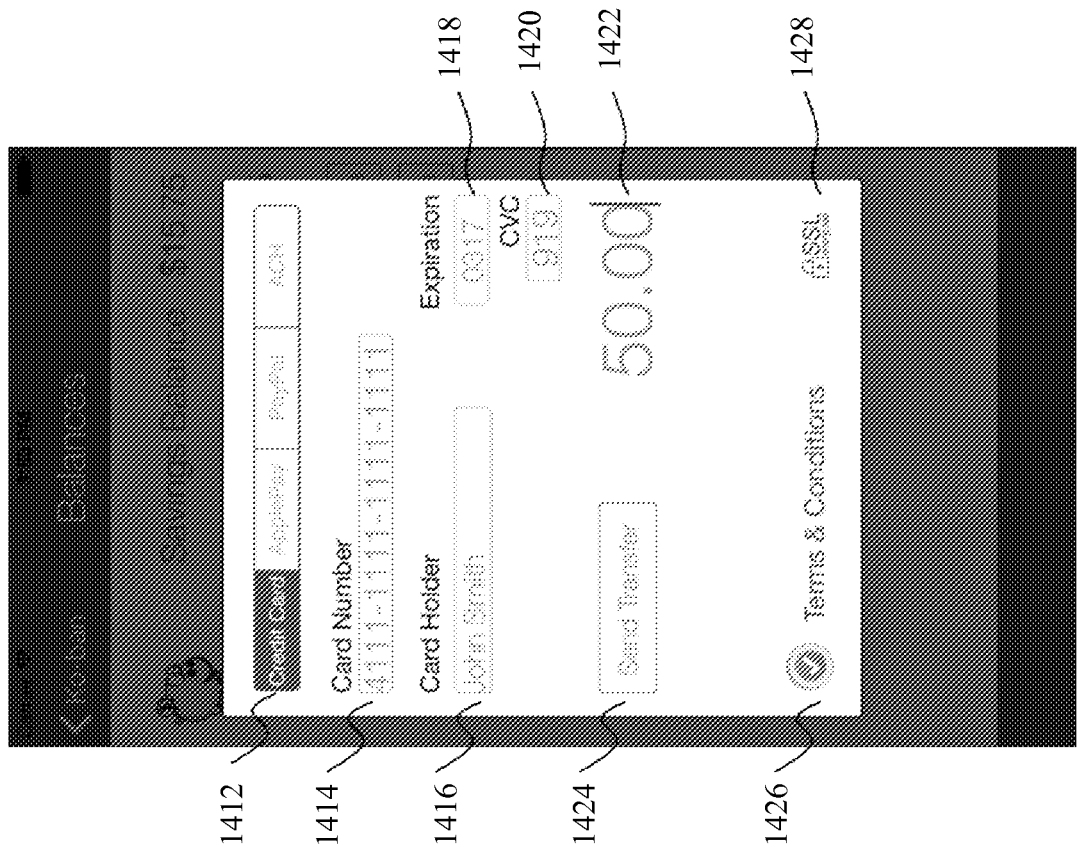

FIGS. 14 and 15 illustrate exemplary deposit pages of a financial management application that constitutes a user interface of the financial management system 102 according to an embodiment of the present teaching.

FIG. 14 illustrates a blank deposit page of the financial management application. In some embodiments, an account user (e.g., the administrator, an authorized user) may reach the page after logging into the financial management application, and clicking on the icon 520 as illustrated in the Home page in FIG. 5. In some embodiments, the financial management system may send an email along with an authentication code or a link to the contributor who has the access privilege of making a deposit into the account. The link may be associated with the financial management application, when clicked may redirect to a webpage of the financial management application or a portal webpage of the financial management system. In some embodiments, the link or the authorization code does not have an expiration date; the contributor may repeatedly make deposits into the account when he wishes using the link or the authorized code. In some embodiments, the link or the authorization code may have an expiration date or may expire after the number of deposit transactions reaches a threshold. The administrator of the account may set or revise the rules applicable to the contributor. For example, the administrator may add a new contributor who may make a deposit to the account, remove or suspend the access privilege of the contributor to make deposits. The administrator may set rules regarding the frequency, the amount limit of a deposit or within a period of time, or the like, or a combination thereof. As illustrated at 1412 in FIG. 14, funds to be deposited into the account may be from, e.g., a credit card, a banking account, ApplePay, PayPal™, Automated Clearing House (ACH), or other electronic payment/transfer systems, including intra-system transfers between account users. Merely by way of example, the administrator may transfer money from within the account to an authorized user of the account, i.e. making the money available to the authorized user. Funds in the form of, e.g., cash, check, may also be deposited into the account. Such sources of funds provided by the account user may be stored in, e.g., the financial information database 312, or may be transmitted to the financial management system 102 at the time the deposit is made.

If the account user chooses to make a deposit using a credit card, the account user may provide the card number 1414, the name of the card holder 1416, the expiration date 1418, the CVC code 1420, and the amount of the deposit 1422. Then the account user may click the "Send Transfer" icon 1424 to complete the deposit. The deposit page may also include a link to the "Terms and Conditions" 1426 of using the financial management application, and an icon 1428 indicating that the SSL is used for security purposes. The deposit page may further include an icon 1402 that the account user may click to go back to a previous page or the Home page of the financial management application. The page may further show information including, e.g., the title of the page 1404, time, battery life of the device on which the financial management application is being used, the carrier of the device on which the financial management application is being used, or the like, or a combination thereof. FIG. 15 illustrates a deposit page similar to that illustrated in FIG. 14 except that information regarding the credit card from which the deposit is made is filled in on the page.

Figure 16:
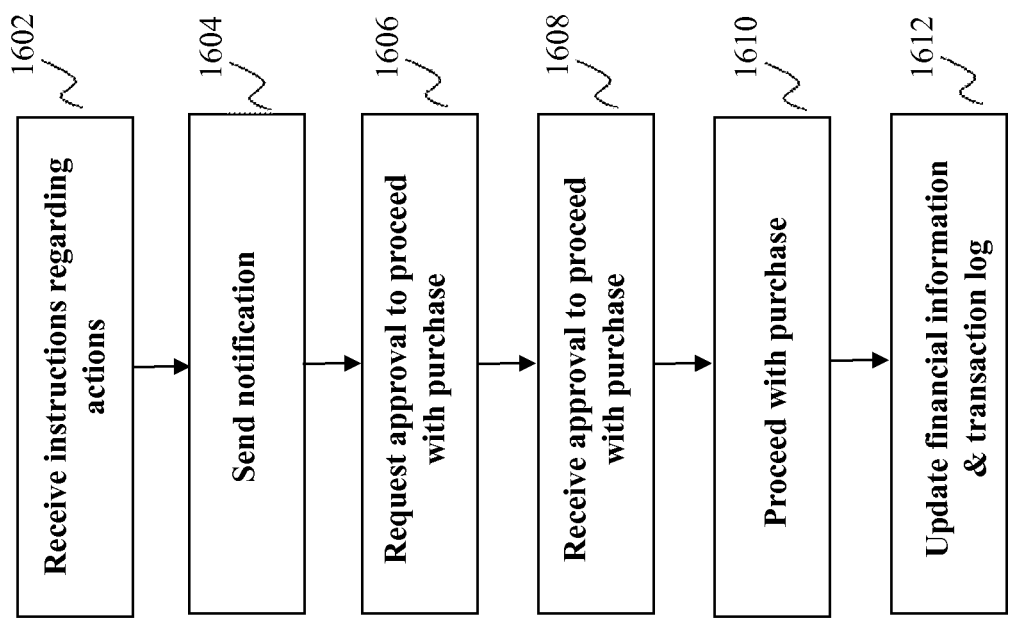
FIG. 16 illustrates a flowchart of an exemplary process for a purchase transaction according to an embodiment of the present teaching.

FIG. 16 illustrates a flowchart of an exemplary process for a purchase (also referred to as a purchase transaction) according to an embodiment of the present teaching. At 1602, instructions regarding at least one action to be performed with respect to a purchase transaction are obtained. The purchase module 1204 then proceeds according to the instructions. According to the instructions, at least some of the at least one action (e.g., sending a notification regarding or a request for approval of a purchase, payment or other actions related to communicating with a vendor to complete the purchase, communicating with the financial information database 312, etc.) may be performed by the purchase module 1204. According to the instructions, at least some of the at least one action (e.g., payment or other actions related to communicating with a vendor to complete the purchase, etc.) may be performed by a service provider and/or a financial institution. As illustrated, a notification regarding a request to make a purchase by an account user (e.g., the administrator, an authorized user) is sent to, e.g., the administrator of the account, at 1604. A request for approval to proceed with the purchase is sent to, e.g., the administrator of the account, at 1606. If the approval is received at 1608, the purchase module 1204 may proceed further with the purchase at 1610. After the purchase is completed, the financial information database 312 and/or the transaction log 318 may be updated accordingly at 1612. In some embodiments, some of the steps described above are not performed.

Merely by way of example, no notification or approval by, e.g., the administrator may be needed before the purchase module 1204 may proceed further in the purchase transaction. As another example, if the request for the purchase transaction is rejected, the purchase transaction is aborted. A notification may be sent to the account user who has requested or initiated the purchase transaction, and/or to the account user who has rejected the request for the purchase transaction.

In some embodiments, payment or funds transfer to complete a transaction, e.g., a purchase transaction, a deposit transaction, a savings transaction, may be made using, e.g., an electronic payment service provider like PayPal™. Merely by way of example, in a purchase transaction, payment may be made using, e.g., an actual payment card number (e.g., the card number of an actual credit card, or a card number assigned to the account user for him to make payments using funds available to him in the account), or a transaction identifier. A transaction identifier may be, e.g., a payment verification code, which in turn may be, e.g., a bar code, a virtual card number, etc. In some embodiments, the transaction identifier is generated by the financial management system 102, e.g., by the purchase module 1204 of the financial management system 102. In some embodiments, the transaction identifier is generated by a third-party service provider (e.g., InComm). Merely by way of example, the transaction identifier is generated by an external service provider REST API that specializes in or is capable of handling transactions with vendors (e.g., online or local merchants). In some embodiments, the transaction identifier is static. In some embodiments, the transaction identifier may change. For instance, the transaction identifier may change, e.g., for each use, for each vendor, after a time period, upon request by the administrator or the authorized user, or the like. The transaction identifier that may be used on a vendor website, or at a vendor's point-of-sale (POS) location or device. This feature may allow for a request for payment to be declined if a vendor or an unauthorized third-party tries to access an account for an unauthorized transaction, including additional transactions beyond an initial one or beyond the authorized transaction limit(s), or amount. A unique transaction identifier that is only authorized for a single use and/or required password and/or pin number or other personal identifier (e.g. fingerprint) may reduce the need to encrypt or otherwise secure transaction data, which is a departure from traditional card or electronic payment transaction systems.

A remittance statement may be generated and transmitted, reconciliation data may be received after payment to the vendor 114 is made, and the reconciliation data may be used to reconcile payments in the account in association with the financial institution 104 where the funds are actually held, e.g., a bank or card processor. A remittance statement may be based on a custom template. After the payment or the purchase is completed, the financial information database 312 may be updated accordingly at 1612.

The transaction engine 314 may be incorporated into or be associated with a larger system that may include an accounting system, a virtual card number assignment system, and/or other components, including a system to optimize the selection of the payment card or type (e.g. electronic funds transfer, payment through an affiliate program). In some embodiments, the transaction engine 314 operates as a stand-alone system that interfaces with other engines, modules of the portal website of the financial management system 102 or the financial management application, as needed. In some embodiments, the portal website of the financial management system 102 or the financial management application is used to manually enter payment data, select a data source, and/or initiate, transmit information or control other aspects of a financial transaction. In some embodiments, the purchase module 1204 may export and import data to and from an accounting program.

In some embodiments, the financial management system 102 may further include a user interface, e.g., a portal website or a mobile application, suitable for vendors. Through the vendor interface, the vendor may communicate with the financial management system 102 directly. Merely by way of example, a vendor may, through the vendor interface, communicate with the financial management system 102 regarding a specific transaction by or on behalf of an authorized user of an account with the financial management system 102. The financial management system 102 may extract information regarding the transaction from the communication, and determine one or more actions to be performed related to the transaction, as discussed above.

Figure 17:
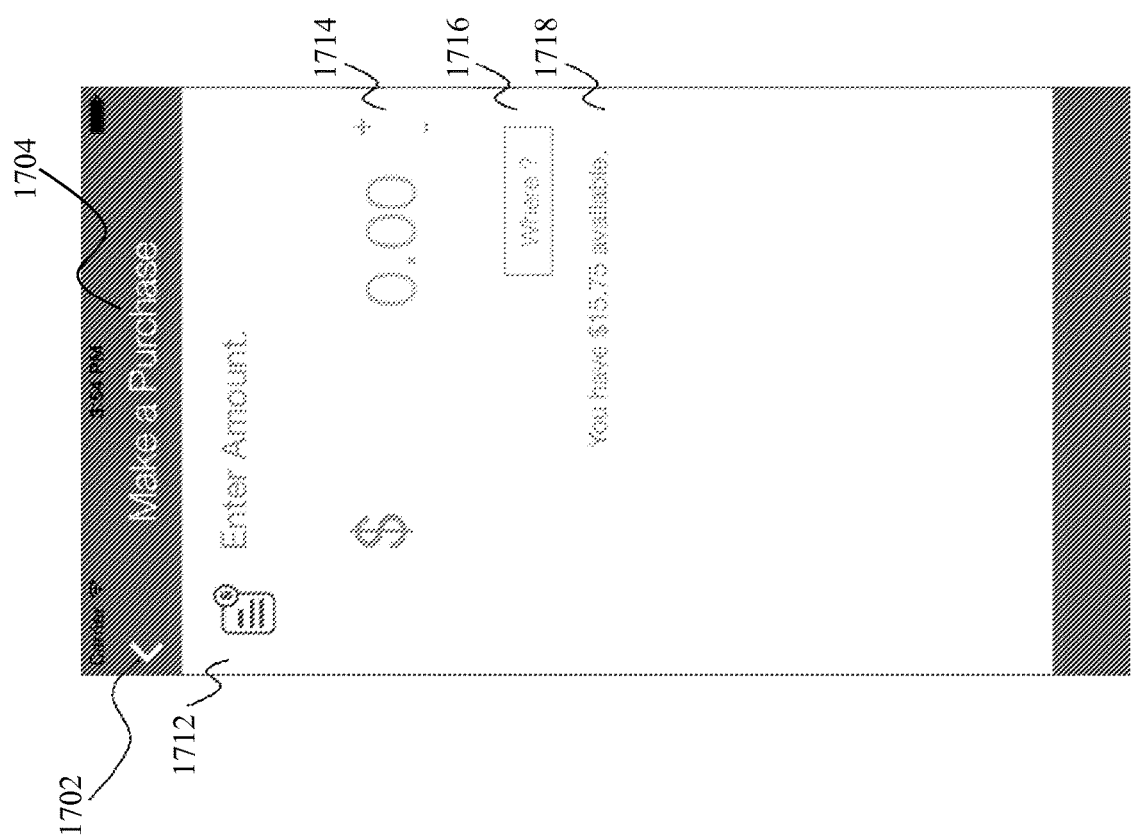
FIGS. 17 and 18 illustrate exemplary pages where a user may make a request for a purchase transaction according to an embodiment of the present teaching.
Figure 18:
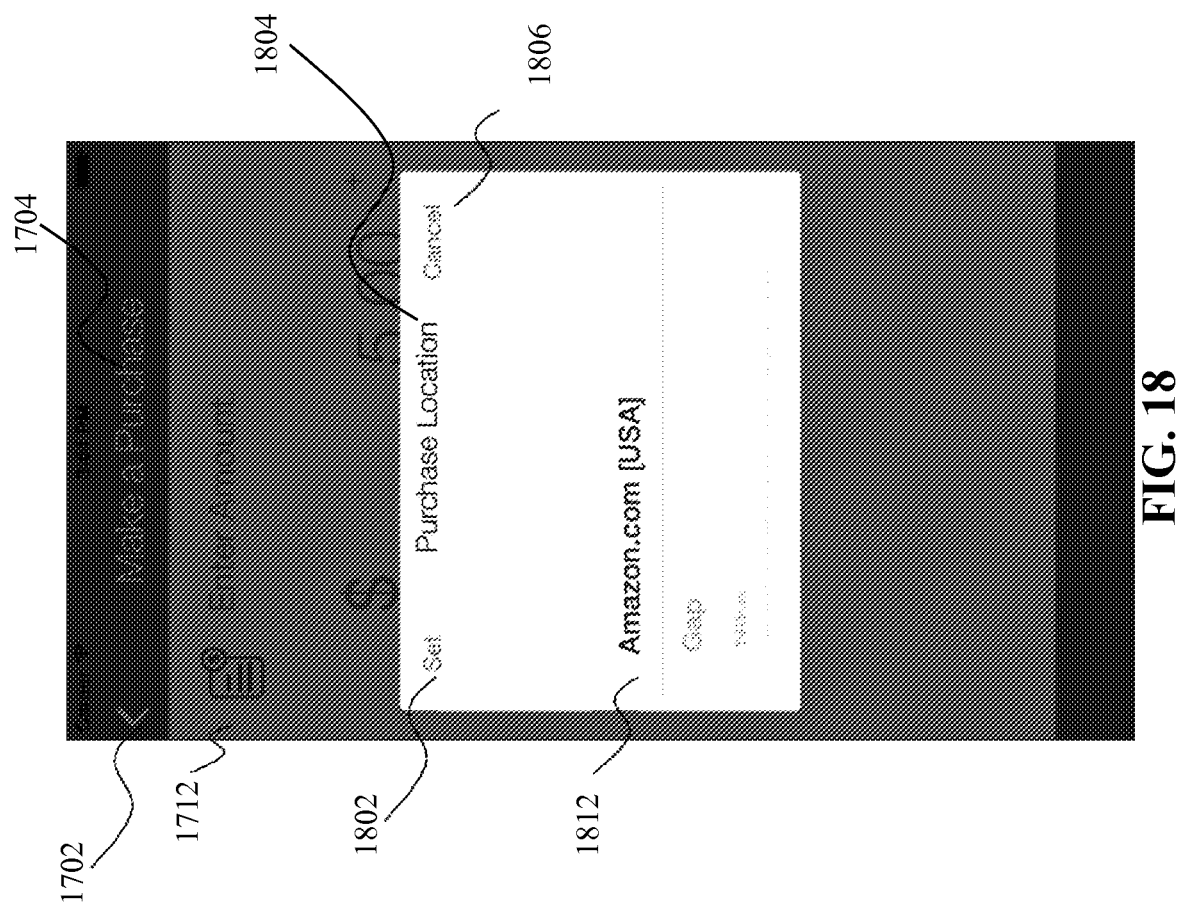

FIGS. 17 and 18 illustrate exemplary pages of a financial management application that constitutes a user interface of the financial management system 102 where an account user may make a request for a purchase transaction according to an embodiment of the present teaching. An account user, e.g., the administrator, an authorized user, may reach the page by, e.g., clicking the icon 518 on the Home page of the financial management application illustrated in FIG. 5. As illustrated in FIG. 17, an account user who wishes to make a purchase using the account may be prompted at 1712 to enter the amount involved in the purchase at 1714. The amount may be typed, or may be specified using the plus sign and the minor sign available on the page. The account user may then need to specify where the purchase is to be performed at 1714. The page may also include information regarding funds available to the account user. The page may further include an icon 1702 that the account user may click to go back to a previous page or the Home page of the financial management application. The page may further show information including, e.g., the title of the page 1704, time, battery life of the device on which the financial management application is being used, the carrier of the device on which the financial management application is being used, a link to the terms and conditions of using the financial management application, or the like, or a combination thereof.

FIG. 18 illustrates a pop-up page in which the purchase location may be specified. As illustrated, the specific purchase is made at Amazon.com [USA] 1812. After the account user enters or chooses the purchase location, the account user may click "Set" icon 1802 to confirm the setting or selection. The account user may abort or undone the setting or selection by clicking the "Cancel" icon 1806.

Figure 19:
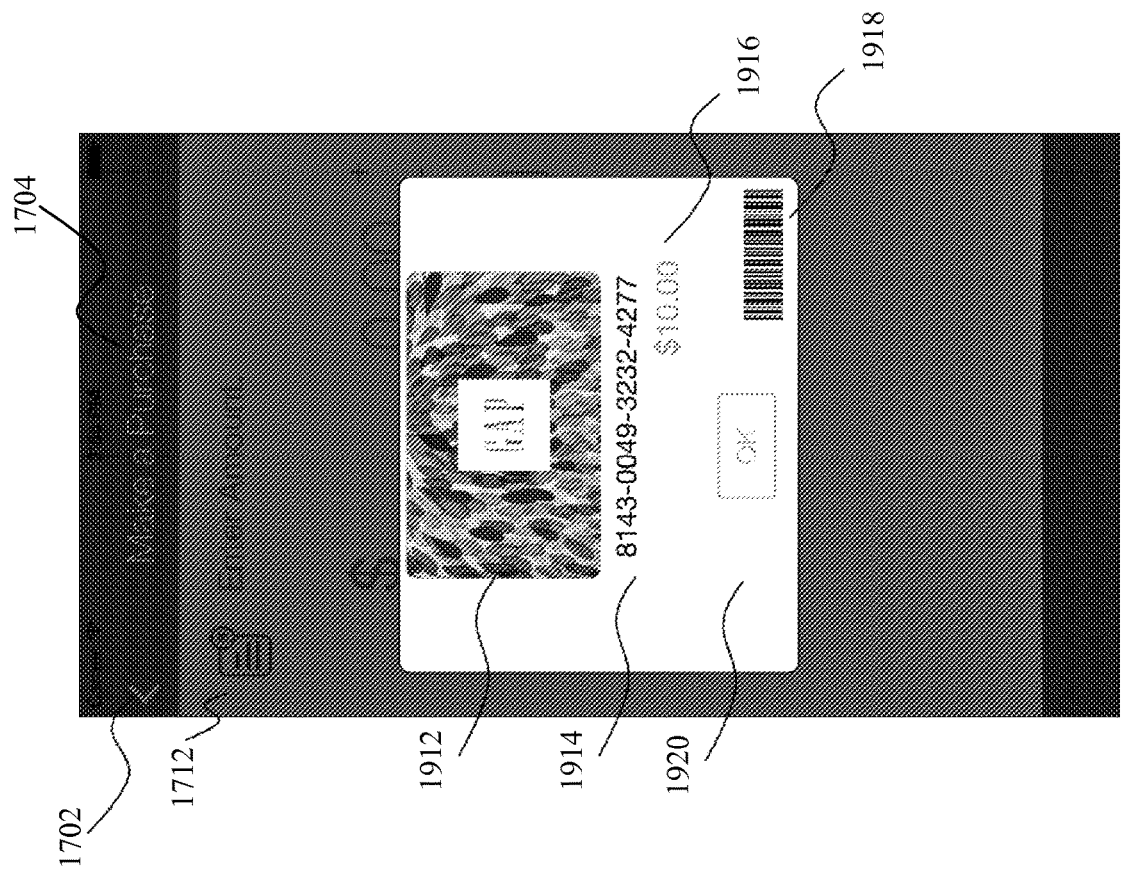
FIG. 19 illustrates an exemplary virtual card with a virtual card number which may be used in a purchase transaction according to an embodiment of the present teaching.

FIG. 19 illustrates an exemplary virtual card with a virtual card number which may be used in a purchase transaction according to an embodiment of the present teaching. The virtual card number may be provided or generated by the financial management system 102 (e.g., by the purchase module 1204), a third-party service provider (e.g., InComm), or the like. The virtual card may be used in a transaction, e.g., a purchase, at GAP.com or in a physical store of GAP. The virtual card may include an image of a card 1912, a virtual card number 1914, the amount available for the purchase 1916, and a bar code 1918. The account user may click "OK" icon 1920 to confirm the use of the virtual card.

Figure 20:
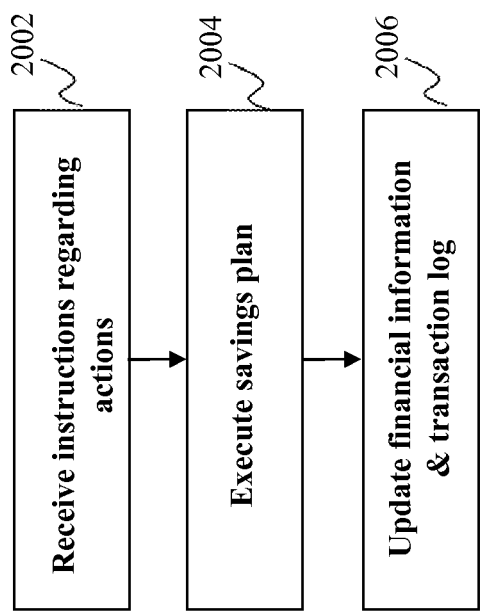
FIG. 20 illustrates a flowchart of an exemplary savings process according to an embodiment of the present teaching.

FIG. 20 illustrates a flowchart of an exemplary savings process (also referred to as a savings transaction) according to an embodiment of the present teaching. At 2002, instructions regarding at least one action to be performed with respect to a savings process are obtained. According to the instructions, at least some of the at least one action (e.g., sending a notification regarding or a request for approval of a savings plan, funds transfer or other actions related to the savings transaction, communicating with the financial information database 312, etc.) may be performed by the savings module 1206. According to the instructions, at least some of the at least one action (e.g., funds transfer or other actions related to the savings transaction, etc.) may be performed by a service provider and/or a financial institution. The savings module 1206 then proceeds according to the instructions at 2004. Afterwards, the financial information database 312 and/or the transaction log 318 may be updated accordingly at 2006. In some embodiments, additional steps are performed. Merely by way of example, a notification is sent to an account user, e.g., the administrator, regarding the savings process. In some embodiments, some of the steps described above are not performed. Merely by way of example, if the account user setting up the savings plan does not have enough funds available, the savings plan is not executed. A notification may be sent to the account user regarding the same.

Figure 21:
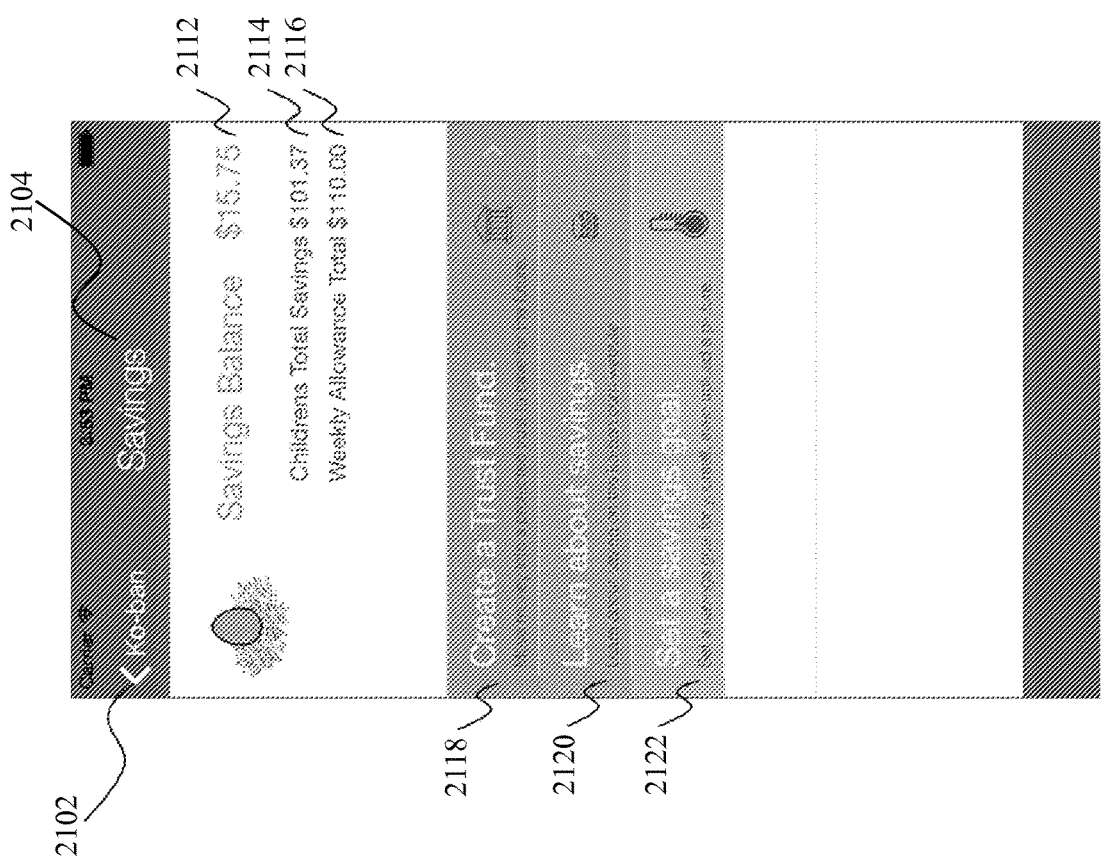
FIG. 21 illustrates an exemplary Savings page according to an embodiment of the present teaching.
Figure 22:
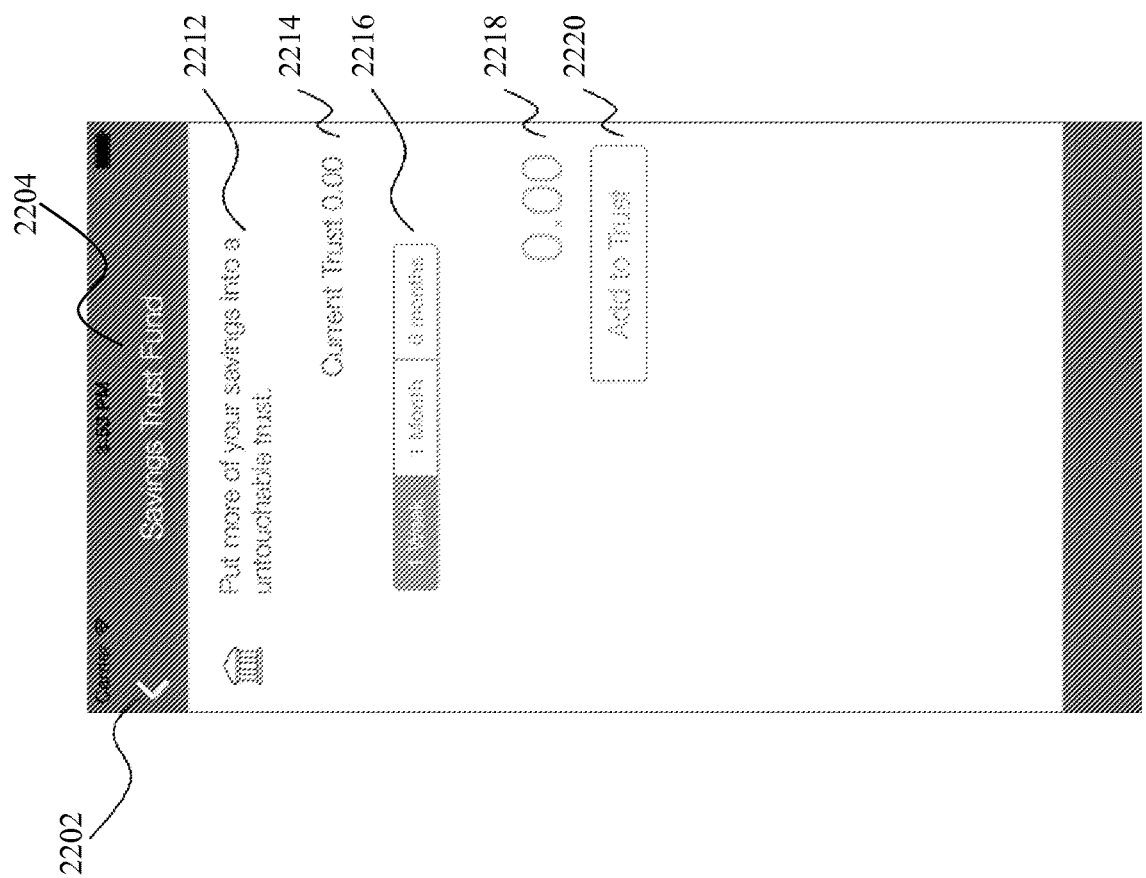
FIGS. 22 and 23 illustrate exemplary pages where an account user may set up a savings plan according to an embodiment of the present teaching.
Figure 23:
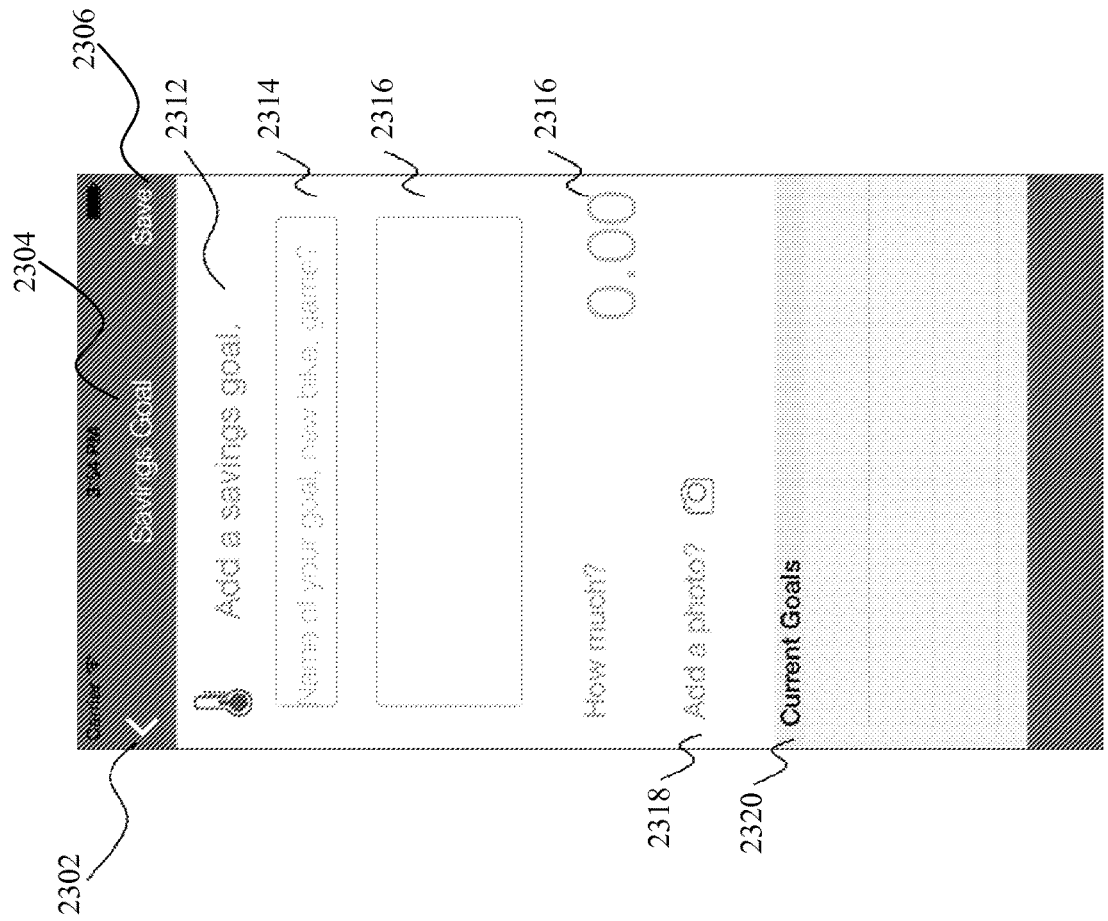

FIGS. 21-23 illustrate exemplary Savings pages of a financial management application that constitutes a user interface of the financial management system 102. FIG. 21 illustrates an exemplary Savings page according to an embodiment of the present teaching. An account user, e.g., the administrator, an authorized user, may reach the page by, e.g., clicking the icon 516 on the Home page of the financial management application illustrated in FIG. 5. As illustrated in FIG. 21, the Savings page includes a summary of the savings balance for an account user 2112, total savings balance for a plurality of account users 2114, and a summary of the weekly allowance for a plurality of account users 2116. The savings page may include a summary of other items related to the account. The Savings page may include a bar 2118, at least part of which may be clickable to go to a process to create a "trust fund" to restrict a certain amount of the account balance or savings, which may not be used for purchase transactions for a set period of time. The Savings page may also include a bar 2120, at least part of which may be clickable to learn more about the savings account or more general knowledge about savings. The Savings page may further include a bar 2122, at least part of which may be clickable for an account user to set up a savings goal. The Savings page may further include an icon 2102 that the account user may click to go back to a previous page or the Home page of the financial management application. The page may further show information including, e.g., the title of the page 2104, time, battery life of the device on which the financial management application is being used, the carrier of the device on which the financial management application is being used, or the like, or a combination thereof.

FIG. 22 illustrates an exemplary page where an account user (e.g., the administrator, an authorized user) may set up a "trust fund" according to an embodiment of the present teaching. The portion of savings into put in the "trust fund" may be locked or restricted until the duration of the trust is over (e.g., 1 week, 1 month, 6 months). The page may include a brief description 2212 of the page, a summary of the current "trust fund" 2214, duration of a trust (e.g., 1 week, a month, 6 months), and the amount to be put in the "trust fund" 2218. When the account user click the "Add to Trust" icon 2220, the "trust fund" is set. The page may also include an icon 2202 that the account user may click to go back to a previous page or the Home page of the financial management application. The page may further show information including, e.g., the title of the page 2204, time, battery life of the device on which the financial management application is being used, the carrier of the device on which the financial management application is being used, or the like, or a combination thereof.

FIG. 23 illustrates an exemplary page where an account user (e.g., the administrator, an authorized user) may set up a savings goal according to an embodiment of the present teaching. The page may include a brief description 2312 of the page, a space 2314 to name the goal, e.g., a new bike, a game, or the like, a space 2316 to add some notes regarding the goal, the amount of the savings goal 2316, and an "Add a photo?" icon 2318 that allows the addition of a photo of, e.g., the goal. The page may also include a summary of "Current Goals" 2320 of this or other account users. The page may further include an icon 2302 that the account user may click to go back to a previous page or the Home page of the financial management application, and a "Save" icon 2306 that the account user may click to save the savings goal. The page may further show information including, e.g., the title of the page 2304, time, battery life of the device on which the financial management application is being used, the carrier of the device on which the financial management application is being used, or the like, or a combination thereof.

Figure 24:
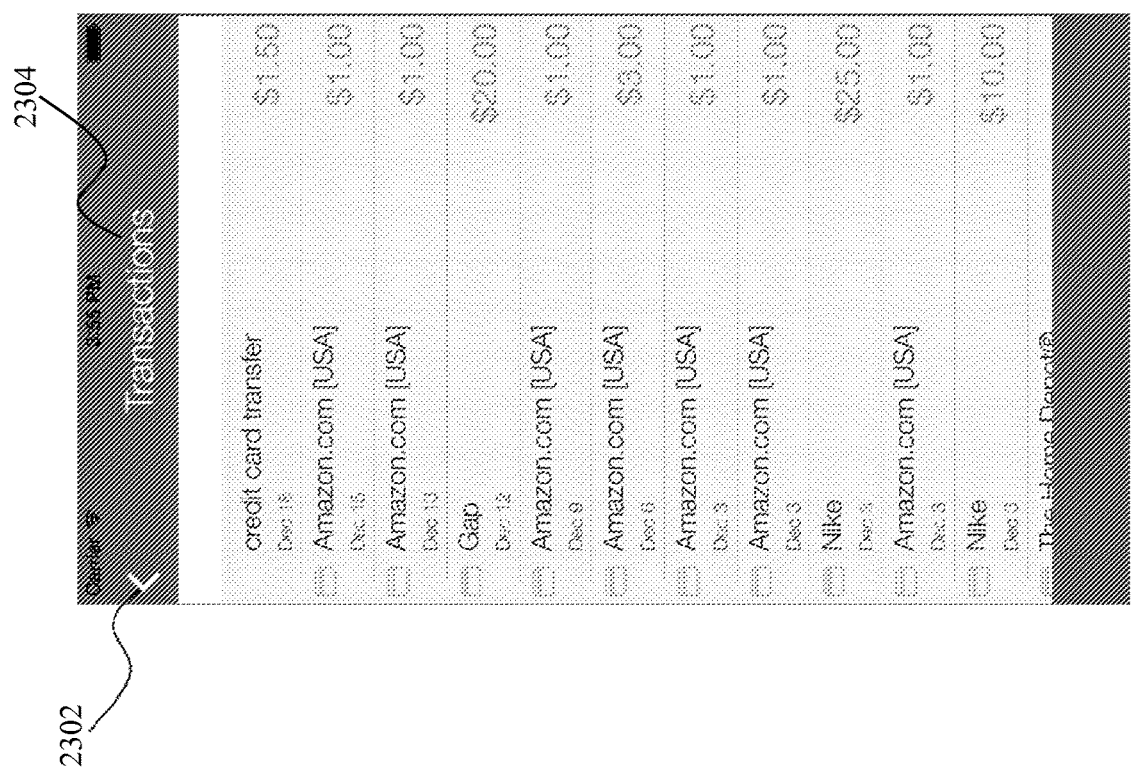
FIG. 24 illustrates an exemplary transaction history page according to an embodiment of the present teaching.

FIG. 24 illustrates an exemplary transaction history page of a financial management application that constitutes a user interface of the financial management system 102 according to an embodiment of the present teaching. The page provides a summary of transactions related to one or more account users (e.g., the administrator, an authorized user). For a transaction, the name of the vendor, the time of transaction, the product or service purchased, and the amount of money involved in the transaction may be provided. The page may further include an icon 2402 that the account user may click to go back to a previous page or the Home page of the financial management application. The page may further show information including, e.g., the title of the page 2404, time, battery life of the device on which the financial management application is being used, the carrier of the device on which the financial management application is being used, or the like, or a combination thereof.

Figure 25:
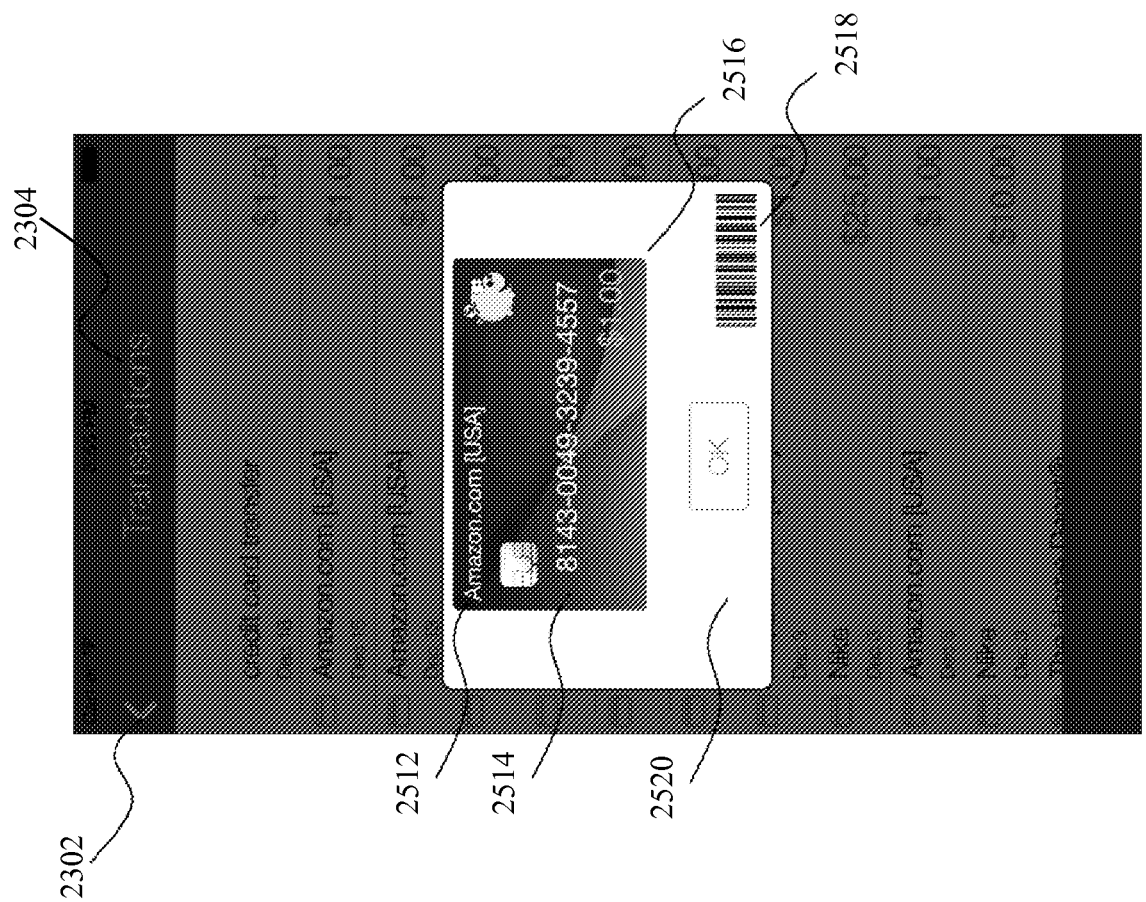
FIG. 25 illustrates an exemplary pop-up page showing a virtual card according to an embodiment of the present teaching.

FIG. 25 illustrates an exemplary pop-up page showing a virtual card used in a transaction according to an embodiment of the present teaching. The pop-up page may be activated by clicking on a transaction shown in FIG. 24. The virtual card may include an image of a card 2512, a virtual card number 2514, the amount involved in the transaction 2516, and a bar code 2518. The account user may click "OK" icon 2520 to, e.g., close the pop-up page showing the virtual card.

Returning to FIG. 3, the notification engine 320 may be configured to send and receive notifications to and from an account user. Merely by way of example, the administrator may be alerted instantly with regard to a purchase, e.g. by email or text messages, a smart-phone application, or periodically through interim account reports. In some embodiments, the administrator may specify that notifications be sent for all, any or no information regarding the account activities by one or more authorized user. As another example, the notification engine 320 may send a request for approval of a transaction to, or receive a response from, e.g., the administrator. The response may be approval or a rejection or denial of the request.

The transaction log 318 may be configured to store information regarding transaction histories of one or more account users. Information stored in the transaction log 318 may include account users, vendors, time of transactions, products or services involved in a transaction, the amount of money involved, or the like, or a combination thereof. The transaction log 318 may receive the information from the transaction engine 314. The transaction log 318 may also be in communication with the monitoring engine 316.

The monitoring engine 316 may be configured to monitoring account activities of one or more account users (e.g., the administrator, an authorized user). In some embodiments, the monitoring engine 316 of the financial management application may be configured to send notifications to, e.g., the administrator information concerning the amount of money available to an authorized user or recent purchases by the authorized user. For instance, the administrator may be notified if the number of transactions carried out at a particular vendor or by the authorized user over the course of a certain time period (e.g. day, week, or month) exceeds a threshold, or if suspicious behavior occurs (such as a number of unsuccessful login attempts or simultaneous login attempts were made). The administrator or an authorized user may receive a notification requesting approval of a particular transaction of another authorized user. A reply via a short message system (SMS)/text message or email may be sent by a parent or contributor through device 108 to respond to the request for approval of the transaction. Alternatively, the system may provide one or more links that may be clicked upon to approve or decline a particular transaction. The request for approval and the response may be sent via the monitoring engine 316 or the notification engine 320.

For instance, a report provided by the monitoring engine 316 may include spending by an account user (e.g., the administrator, an authorized user) including information about the account user's spending patterns, e.g. recent transaction history, an itemized list of all purchased items, with the ability to drill down and get further details on the item, such as the website from which the item was purchased, the total amount spent on that website to date, the date and time of purchase; recent spending patterns compared to prior periods and compared to the total periodic spend allowed, any combination of transaction dates, transaction amounts, number of transactions (e.g., how many times the card has been used) or transactions by vendor, daily, weekly, and monthly sub-totals. The account user's spending data may be charted, and in the case that there are multiple account users, the profiles of at least some of the multiple account users may be compared. The administrator may specify rules regarding, e.g., who receives the reports and the frequency of the reports.

Once logged-in into the profile of an account user (e.g., the administrator, or an authorized user with appropriate access privilege) of the financial management application, the monitoring engine 316 or the transaction log 318 may allow the account user may utilize a "search feature" to search for a completed transaction(s) or completed purchase(s) that meet a specified criteria, e.g. by account/a specific account user, date, amount, vendor, or the like, or a combination thereof.

In some embodiments, the described financial management portal/application may generate revenues by charging service requesters/vendors 114 a fee per transaction, account originations fees from an account user (e.g., the administrator, an authorized user), and/or affiliate fees.

In accordance with one aspect of the invention, the system can automatically "pop up" and present the relevant transaction data to an account user based on context information, e.g. the website an authorized user is currently on (if he is permissioned to make purchases on that site), the time of day it is (if he is permissioned to make purchases at that time), a mobile device location, etc. The financial management system 102 may also serve as or provide a user interface, e.g., a portal webpage, a financial management application, for purchases or other services offered on a vendor's website. When fully integrated, the financial management system 102 may connect to a vendor's backend system, e.g. its POS and inventory systems, or a financial institution's payment processing system to generate transaction reports.

For example, the financial management application may pop up on a mobile device if the account user is in the vicinity of a vendor's store location and a transaction may be initiated when the account user touches his mobile device to the vendor's POS device and the two devices exchange their identifications (account holder ID and vendor ID) for security purposes. If either or both of the identifications fail verification, any proposed transactions will be denied or aborted.

Figure 26:
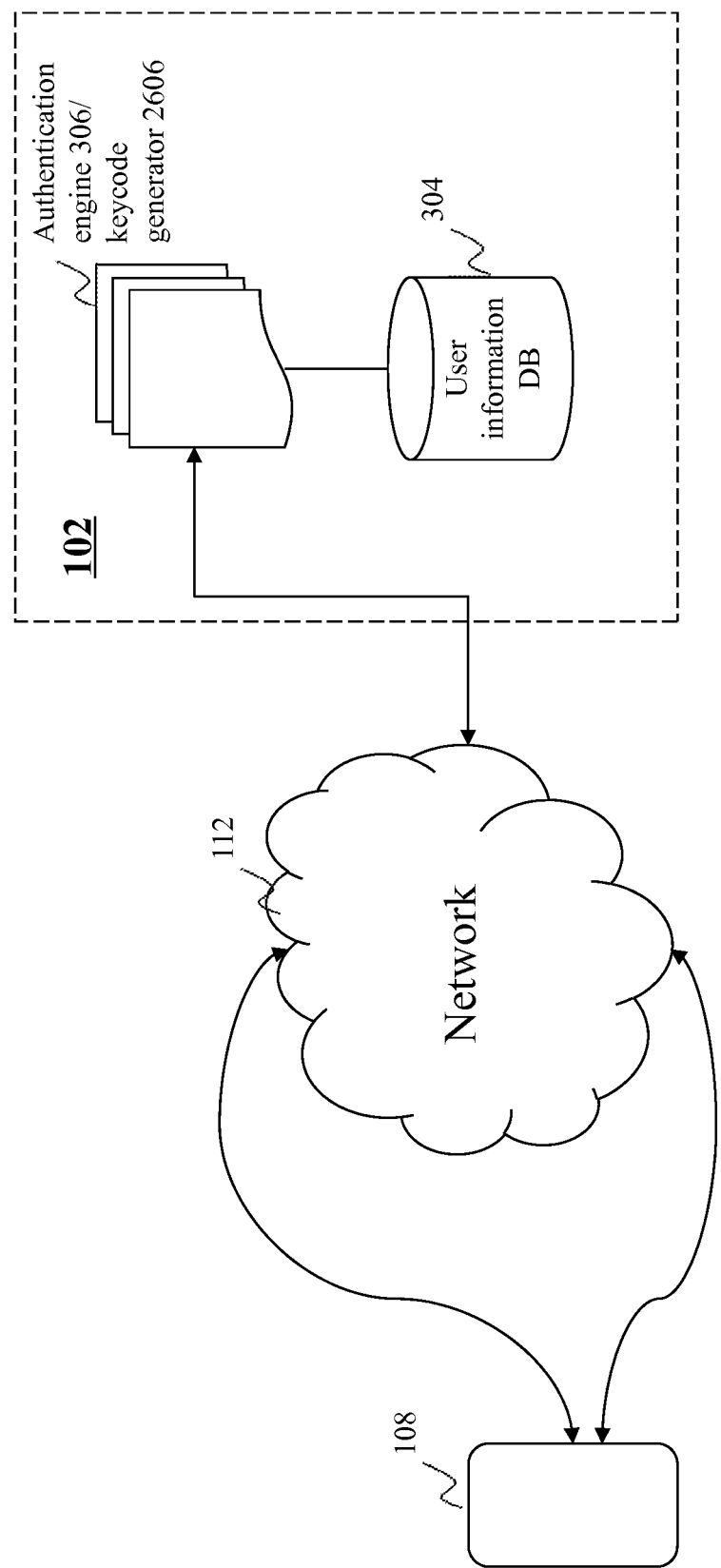
FIG. 26 illustrates an exemplary diagram of passwordless login of a financial management system according to an embodiment of the present teaching.

FIG. 26 illustrates an exemplary diagram of passwordless login of a financial management system according to an embodiment of the present teaching. A user device 108, e.g., a trusted mobile device, may have a user interface of the financial management system 102. The user interface may be, e.g., a financial management application or a portal website disclosed herein. An account user, e.g., the administrator, an authorized user, may send a login request including username based login information (or access credentials) from the user device 108 via the user interface. Merely by way of example, the username based login information may be a username, a coded name recognized by the financial management system 102, an account identification number or name, or the like, or a combination thereof. The login request may be transmitted over the network 112 to the financial management system 102, and the transmitted login information (or access credentials) is compared with that in the user information database 304. The keycode generator 2606 of the financial management system 102 may provide a onetime, timestamped, random keycode that is transmitted back to user device 108 via, e.g., a message or an email. In some embodiments, the keycode generator 2606 may be part of the authentication engine 306. In some embodiments, the keycode generator 2606 may be a unit in the financial management system 102; the keycode generator 2606 may be in communication with but not part of the authentication engine 306. In some embodiments, the account user may enter (e.g., by pasting) the keycode into the user interface of the financial management system 102 on the user device 108. In some embodiments, a link may be provided along with the keycode. The link may pass the onetime keycode to the Uniform Resource Locator (url) on the user device 108. The financial management application may send the onetime keycode to financial management system 102 for login authentication. It is understood that the financial management system 102 may include more components than those shown in FIG. 26.

Figure 27:
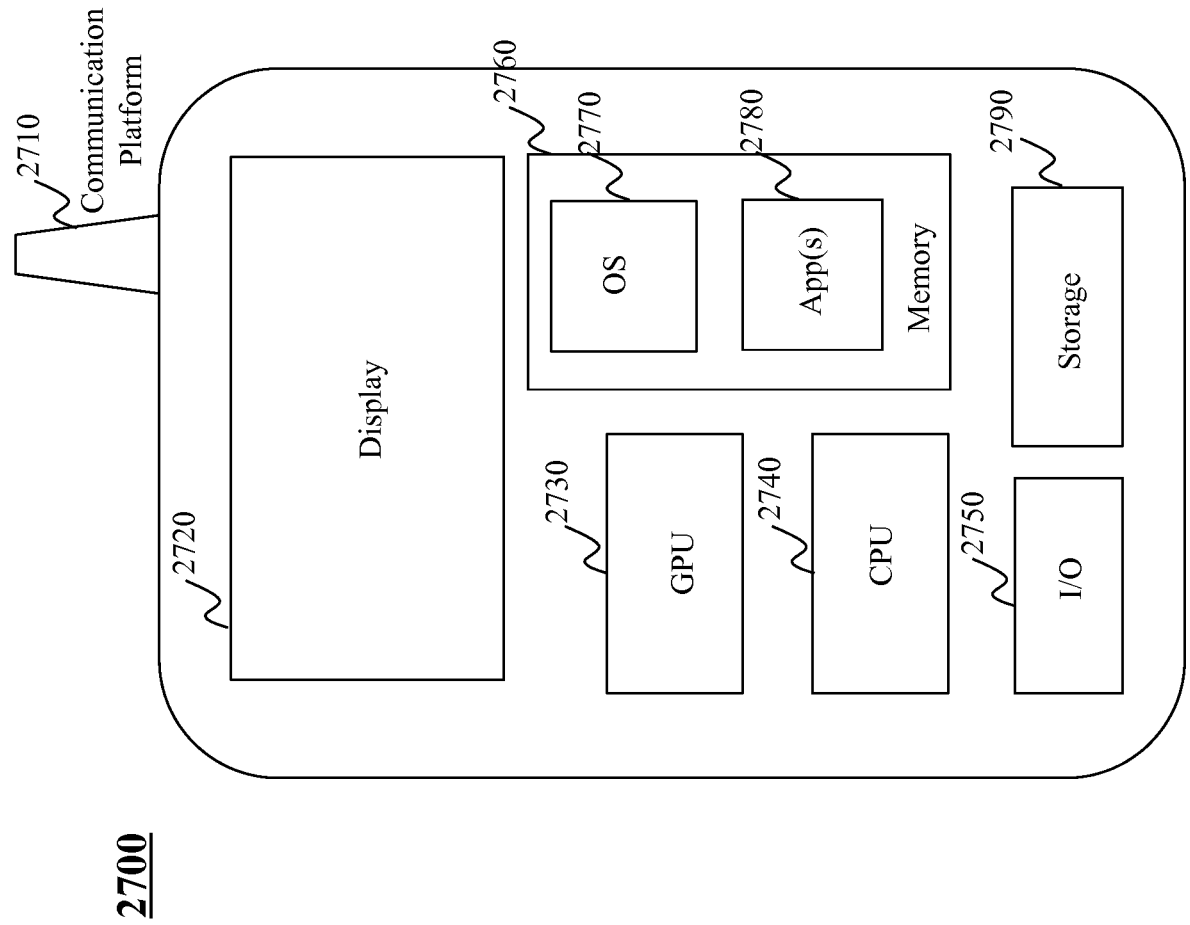
FIG. 27 depicts the architecture of a mobile device which may be used to implement a specialized system incorporating the present teaching.

FIG. 27 depicts the architecture of a mobile device which can be used to realize a specialized system implementing the present teaching. In this example, the user device on which financial information or activities are presented and interacted-with is a mobile device 1600, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 2700 in this example includes one or more central processing units (CPUs) 2740, one or more graphic processing units (GPUs) 2730, a display 2720, a memory 2760, a communication platform 2710, such as a wireless communication module, storage 2790, and one or more input/output (I/O) devices 2750. Any other suitable component, including but not limited to a system bus or a controller (not shown), may also be included in the mobile device 2700. As shown in FIG. 27, a mobile operating system 2770, e.g., iOS, Android, Windows Phone, etc., and one or more applications 2780 may be loaded into the memory 2760 from the storage 2790 in order to be executed by the CPU 2740. The applications 2780 may include a browser or any other suitable mobile apps for performing financial management on the mobile device 2700. User interactions with the vendors and the financial management system 102 may be achieved via the I/O devices 2750 and provided to the financial management system 102 and/or other components of system 100/200, e.g., via the network 112.

To implement various modules, units, and their functionalities described in the present disclosure, computer hardware platforms may be used as the hardware platform(s) for one or more of the elements described herein (e.g., the financial management system 102, the financial institutions (or their servers) 104, and/or other components of system 100/200 described with respect to FIGS. 1-26). The hardware elements, operating systems and programming languages of such computers are conventional in nature, and it is presumed that those skilled in the art are adequately familiar therewith to adapt those technologies for financial management as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

FIG. 28 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 2800 may be used to implement any component of financial management system 102 as described herein. For example, the financial management application, etc., may be implemented on a computer such as computer 2800, via its hardware, software program, firmware, or a combination thereof. Although only one such computer is shown, for convenience, the computer functions relating to financial management as described herein may be implemented in a distributed fashion on a number of similar platforms, to distribute the processing load.

The computer 2800, for example, includes COM ports 2850 connected to and from a network connected thereto to facilitate data communications. The computer 2800 also includes a central processing unit (CPU) 2820, in the form of one or more processors, for executing program instructions. The exemplary computer platform includes an internal communication bus 2810, program storage and data storage of different forms, e.g., disk 2870, read only memory (ROM) 2830, or random access memory (RAM) 2840, for various data files to be processed and/or communicated by the computer, as well as possibly program instructions to be executed by the CPU. The computer 2800 also includes an I/O component 2860, supporting input/output flows between the computer and other components therein such as user interface elements 2880. The computer 2800 may also receive programming and data via network communications.

Hence, aspects of the methods of financial management processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a financial management system operator or other server into the hardware platform(s) of a computing environment or other system implementing a computing environment or similar functionalities in connection with financial management system. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

It is understood that at least part of the descriptions above regarding the financial management application 102 may be applicable to another user interface of the financial management system 102, e.g., a portal website. It is understood that the descriptions above regarding different profiles of different account users of a single account are similarly applicable to the embodiments in which there are a plurality of associated accounts, e.g. a primary account and a secondary account (or a sub-account), where the primary account corresponds to the administrator profile in the single account embodiments, and the secondary account (or sub-account) may correspond to the profile of an authorized user other than the administrator in the single account embodiments.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device. In addition, the financial management system disclosed herein may be implemented as a firmware, firmware/software combination, firmware/hardware combination, or a hardware/firmware/software combination.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

What is claimed is:

1. A method, implemented on a machine including at least one processor, a data storage device, and a communication platform connected to a network for performing account management, the method comprising:

storing, in the storage device, account information for a plurality of first accounts and account information for a second account, wherein the plurality of first accounts and the second account are separate and independently accessible via a graphical user interface (GUI) of a computer application using first access credentials associated with a plurality of first users and a second access credential associated with a second user, respectively;

providing, to the second user, access to the second account based on the second access credential;

receiving, via the GUI from the second user accessing the second account, sets of rules, wherein each ruleset of the sets of rules defines one or more restrictions on usage of the corresponding first account by the respective first user;

storing, in a rule database, the sets of rules in relation to the account information for the plurality of first accounts;

receiving, via the GUI from a mobile device of a specific first user of the plurality of first users, the corresponding first access credential to access the corresponding first account;

responsive to a determination that the specific first user is authorized to access the corresponding first account based on the corresponding first access credential, generating a random keycode and transmitting the random keycode to the mobile device of the specific first user, receiving back, via the GUI, the random keycode transmitted from the mobile device using a particular uniform resource locator to authenticate the specific first user;

responsive to a successful authentication of the specific first user, automatically retrieving from the rule database and activating a specific ruleset from the sets of rules, the specific ruleset corresponding to the specific first user;

receiving, via the GUI from the mobile device of the specific first user, a request with respect to a transaction;

executing actions to complete the transaction in accordance with the specific ruleset, the actions including:

determining whether current context information related to the first user and the transaction including the specific first user's current location satisfies the specific ruleset, and if so, generating transaction data based on the current context information, generating, in accordance with the specific ruleset, a transaction identifier unique for the specific first user and the transaction, and generating an electronic image of a transaction card including the transaction identifier;

automatically transmitting the transaction data and the electronic image of the transaction card to be displayed via the GUI to the first user; and receiving a user input via the GUI by the first user responsive to the electronic image to complete the transaction using the first account.

2. The method of claim 1, wherein the actions further include at least one operation selected from the group consisting of facilitating the transaction, blocking the transaction, and providing a notification to the second user with respect to the transaction.

3. The method of claim 1, wherein the transaction identifier is a virtual card number to complete the transaction.

4. The method of claim 1, wherein the transaction comprises a deposit transaction, a saving transaction, or a purchase transaction.

5. The method of claim 1, wherein the sets of rules relate to at least one subject selected from the group consisting of a deposit transaction to the first account, a purchase transaction using the first account, and a savings plan within the first account.

6. The method of claim 1, wherein the request includes a request to add the transaction into a savings goal associated with the first user.

7. The method of claim 6, further comprising receiving, via the GUI from the second user, a response related to the transaction in the savings goal, wherein the response comprises an approval or a disapproval of a transfer of funds toward the savings goal.

8. The method of claim 1, wherein the first or second access credential comprises a username based login information, and wherein the method further comprises generating a keycode.

9. The method of claim 1, wherein the transaction is with an entity, wherein the entity is a financial institution or a vendor.

10. The method of claim 1, wherein the transaction card further includes information about funds available to the first user and a bar code to complete the transaction.

11. The method of claim 1, wherein the transaction identifier is for a single use identifier.

12. The method of claim 1, further comprising receiving a personal identifier associated with the first user to complete the transaction using the first account.

13. The method of claim 1, wherein the one or more restrictions include a limit on funds to spend over a specific time period, a number of transactions performed over a specific time period, or a list of approved vendors.

14. A system for account management, the system comprising:

a storage device configured to:

store account information for a for a plurality of first accounts and account information for a second account, wherein the plurality of first accounts and the second account are separate and independently accessible via a graphical user interface (GUI) of a computer application using first access credentials associated with a plurality of first users and a second access credential associated with a second user, respectively, and store sets of rules in relation to the account information for the plurality of first accounts, wherein each ruleset of the sets of rules defines one or more restrictions on usage of the corresponding first account by the respective first user; and a processor comprising hardware configured to:

provide, to the second user, access to the second account based on the second access credential, receive, via the GUI from the second user accessing the second account, the sets of rules, receive, via the GUI from a mobile device of a specific first user of the plurality of first users, the corresponding first access credential to access the corresponding first account;

responsive to a determination that the specific first user is authorized to access the corresponding first account based on the corresponding first access credential, generate a random keycode and transmit the random keycode to the mobile device of the specific first user, receive back, via the GUI, the random keycode transmitted from the mobile device using a particular uniform resource locator to authenticate the specific first user;

responsive to a successful authentication of the specific first user, automatically retrieve from the rule database and activating a specific ruleset from the sets of rules, the specific ruleset corresponding to the specific first user;

receive, via the GUI from the mobile device of the specific first user, a request with respect to a transaction;

execute actions to complete the transaction in accordance with the specific ruleset, the actions including:

determining whether current context information related to the first user and the transaction including the specific first user's current location satisfies the specific ruleset, and if so, generating transaction data based on the current context information, generating, in accordance with the specific ruleset, a transaction identifier unique for the specific first user and the transaction, and generating an electronic image of a transaction card including the transaction identifier automatically transmitting the transaction data and the electronic image of the transaction card to be displayed via the GUI to the first user; and receiving a user input via the GUI by the first user responsive to the electronic image to complete the transaction using the first account.

15. The system of claim 14, wherein the transaction comprises a deposit transaction, a saving transaction, or a purchase transaction.

16. The system of claim 14, wherein the sets of rules relate to at least one subject selected from the group consisting of a deposit transaction to the first account, a purchase transaction using the first account, and a savings plan within the first account.

17. The system of claim 14, wherein the transaction card further includes information about funds available to the first user and a bar code to complete the transaction.

18. The system of claim 14, wherein the transaction identifier is for a single use identifier.

19. The system of claim 14, wherein the processor is configured to receive a personal identifier associated with the first user to complete the transaction using the first account.

20. The system of claim 14, wherein the one or more restrictions include a limit on funds to spend over a specific time period, a number of transactions performed over a specific time period, or a list of approved vendors.

21. A non-transitory machine-readable medium having information recorded thereon for account management, wherein the information, when read by a machine, causes the machine to perform:

storing, in a storage device, account information for a plurality of first accounts and account information for a second account, wherein the plurality of first accounts and the second account are separate and independently accessible via a graphical user interface (GUI) of a computer application using first access credentials associated with a plurality of first users and a second access credential associated with a second user, respectively;

providing, to the second user, access to the second account based on the second access credential;

receiving, via the GUI from the second user accessing the second account, sets of rules, wherein each ruleset of the sets of rules defines one or more restrictions on usage of the corresponding first account by the respective first user;

storing, in a rule database, the sets of rules in relation to the account information for the plurality of first accounts;

receiving, via the GUI from a mobile device of a specific first user of the plurality of first users, the corresponding first access credential to access the corresponding first account;

responsive to a determination that the specific first user is authorized to access the corresponding first account based on the corresponding first access credential, generating a random keycode and transmitting the random keycode to the mobile device of the specific first user, receiving back, via the GUI, the random keycode transmitted from the mobile device using a particular uniform resource locator to authenticate the specific first user;

responsive to a successful authentication of the specific first user, automatically retrieving from the rule database and activating a specific ruleset from the sets of rules, the specific ruleset corresponding to the specific first user;

receiving, via the GUI from the mobile device of the specific first user, a request with respect to a transaction;

executing actions to complete the transaction in accordance with the specific ruleset, the actions including:

determining whether current context information related to the first user and the transaction including the specific first user's current location satisfies the specific ruleset, and if so, generating transaction data based on the current context information, generating, in accordance with the specific ruleset, a transaction identifier unique for the specific first user and the transaction, and generating an electronic image of a transaction card including the transaction identifier;

automatically transmitting the transaction data and the electronic image of the transaction card to be displayed via the GUI to the first user; and receiving a user input via the GUI by the first user responsive to the electronic image to complete the transaction using the first account.

22. The medium of claim 21, wherein the transaction comprises a deposit transaction, a saving transaction, or a purchase transaction.

23. The medium of claim 21, wherein the set of rules relate to at least one subject selected from the group consisting of a deposit transaction to the first account, a purchase transaction using the first account, and a savings plan within the first account.

24. The medium of claim 21, wherein the transaction card further includes information about funds available to the first user and a bar code to complete the transaction.

* * * * *